(12) United States Patent
Wang et al.

(10) Patent No.: US 11,812,098 B2
(45) Date of Patent: Nov. 7, 2023

(54) PROJECTED AUDIO AND VIDEO PLAYING METHOD AND ELECTRONIC DEVICE

(71) Applicant: Huawei Technologies Co., Ltd., Shenzhen (CN)

(72) Inventors: Bihai Wang, Shenzhen (CN); Licheng Song, Hangzhou (CN); Zhenfang Fang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/779,295

(22) PCT Filed: Oct. 19, 2020

(86) PCT No.: PCT/CN2020/121756
§ 371 (c)(1),
(2) Date: May 24, 2022

(87) PCT Pub. No.: WO2021/103846
PCT Pub. Date: Jun. 3, 2021

(65) Prior Publication Data
US 2022/0408136 A1    Dec. 22, 2022

(30) Foreign Application Priority Data
Nov. 25, 2019  (CN) .......................... 201911169032.3

(51) Int. Cl.
*H04N 21/439*  (2011.01)
*H04N 21/41*  (2011.01)
(Continued)

(52) U.S. Cl.
CPC ....... *H04N 21/439* (2013.01); *H04N 21/4108* (2013.01); *H04N 21/4122* (2013.01);
(Continued)

(58) Field of Classification Search
CPC .......... H04N 21/4126; H04N 21/4122; H04N 21/4316; H04N 21/4223; H04N 21/4108;
(Continued)

(56) References Cited

U.S. PATENT DOCUMENTS 5,838,384 A * 11/1998 Schindler .............. G06F 3/1423
715/810
9,276,921 B2 * 3/2016 Birkler ............... G06Q 20/3276
(Continued)

FOREIGN PATENT DOCUMENTS

CN          1791198 A      6/2006
CN        102355587 A      2/2012
(Continued)

*Primary Examiner* — John R Schnurr
(74) *Attorney, Agent, or Firm* — Conley Rose, P.C.

(57) ABSTRACT

A video playing method includes receiving first data sent by a first source device and second data sent by a second source device, where the first data comprises first display data and first audio data, and where the second data comprises second display data and second audio data; displaying the first display data in a first screen subarea of the destination device and the second display data in a second screen subarea of the destination device; and playing the first audio data by using a first speaker device and the second audio data by using a second speaker device, where the first speaker device is an external speaker wirelessly connected with the destination device, and where the second speaker device is a built-in audio module of the destination device.

20 Claims, 27 Drawing Sheets

(51) Int. Cl.
  *H04N 21/431* (2011.01)
  *H04N 21/414* (2011.01)
  *H04N 21/4363* (2011.01)
  *H04N 21/4223* (2011.01)

(52) U.S. Cl.
  CPC ... *H04N 21/4126* (2013.01); *H04N 21/41407* (2013.01); *H04N 21/431* (2013.01); *H04N 21/4316* (2013.01); *H04N 21/43637* (2013.01); *H04N 21/4223* (2013.01)

(58) Field of Classification Search
  CPC ....... H04N 21/41407; H04N 21/43637; H04N 21/431; H04N 21/439
  See application file for complete search history.

(56) References Cited

U.S. PATENT DOCUMENTS

| | | | |
|---|---|---|---|
| 10,735,408 B2 * | 8/2020 | Singhal | ............... H04L 63/0853 |
| 2004/0133430 A1 * | 7/2004 | Tsuchiuchi | ................ G06F 3/16 |
| | | | 704/278 |
| 2006/0028542 A1 | 2/2006 | Rondinelli et al. | |
| 2006/0117379 A1 | 6/2006 | Bennett et al. | |
| 2012/0284650 A1 | 11/2012 | Chang et al. | |
| 2012/0291075 A1 | 11/2012 | Pan | |
| 2014/0333508 A1 * | 11/2014 | Yuann | ................... G06F 3/0346 |
| | | | 345/2.1 |
| 2014/0347295 A1 | 11/2014 | Kim et al. | |
| 2015/0334442 A1 * | 11/2015 | Charania | ............ H04N 21/4821 |
| | | | 725/44 |
| 2019/0320219 A1 * | 10/2019 | Yoden | ................... H04W 8/005 |
| 2021/0344991 A1 * | 11/2021 | Todd | ................... H04N 21/4438 |
| 2022/0137914 A1 | 5/2022 | Xiong et al. | |
| 2022/0295027 A1 | 9/2022 | Wang et al. | |
| 2022/0408136 A1 | 12/2022 | Wang et al. | |

FOREIGN PATENT DOCUMENTS

| | | |
|---|---|---|
| CN | 103888808 A | 6/2014 |
| CN | 108366062 A | 8/2018 |
| CN | 110147199 A | 8/2019 |
| CN | 110191350 A | 8/2019 |
| CN | 110213646 A | 9/2019 |
| CN | 110351407 A | 10/2019 |
| CN | 110381197 A | 10/2019 |
| CN | 110381345 A | 10/2019 |
| CN | 111131866 A | 5/2020 |
| JP | H0898102 A | 4/1996 |
| JP | 2007189633 A | 7/2007 |

\* cited by examiner

PROJECTED AUDIO AND VIDEO PLAYING METHOD AND ELECTRONIC DEVICE

CROSS-REFERENCE TO RELATED APPLICATIONS

This is a National Stage of International Patent Application No. PCT/CN2020/121756 filed on Oct. 19, 2020, which claims priority to Chinese Patent Application No. 201911169032.3 filed on Nov. 25, 2019. All of the aforementioned applications are hereby incorporated by reference in their entireties.

TECHNICAL FIELD

This disclosure relates to the field of terminal technologies, and in particular, to a projected audio and video playing method and an electronic device.

BACKGROUND

Currently, projection functions have been widely used in electronic devices. For example, a user may project, for display, a display interface in a mobile phone (namely, a source 'device') onto another destination device (for example, a smart television (TV)) that supports a projection function, so that the user can conveniently view, on one device, display content on another device.

In a projection application scenario, display content in a plurality of source devices may be projected onto a same destination device for display. For example, a user A may project a game interface 1 displayed on a mobile phone 1 onto a smart TV for display, and a user B may project a game interface 2 displayed on a mobile phone 2 onto the smart TV for display.

The user has not only a demand for sharing video images and pictures, but also a demand for sharing audio and a video at the same time. In the current projection application scenario, after receiving a plurality of channels of audio data from the plurality of source devices, the destination device decodes each channel of audio data for audio mixing and output. Audio mixing means that two channels of audio data (or a plurality of channels of audio data) are simultaneously output, and the channels of audio data are simultaneously output through all speakers, to implement audio data synthesis, and finally reflect an effect of mixing the two channels of audio data (or the plurality of channels of audio data) together. This audio mixing manner causes audio-visual confusion on projectionist's senses. In addition, a larger quantity of projection source devices is more prone to exacerbate the audio-visual confusion of the projectionist. In this case, a projection effect is greatly reduced.

SUMMARY

Embodiments of this disclosure provide a projected audio and video playing method and an electronic device, to dynamically adjust a speaker device corresponding to a screen, so that a projectionist associates audio with a video on senses, to improve audio-visual experience.

To resolve the foregoing technical problem, embodiments of this disclosure provide the following technical solutions.

According to a first aspect, an embodiment of this disclosure provides a projected audio and video playing method, including: A destination device receives first projection data sent by a first source device, where the first projection data includes first display data and first audio data; the destination device displays the first display data on a screen of the destination device, and plays the first audio data by using all speaker devices of the destination device, where the speaker devices of the destination device include a first speaker device and a second speaker device, the first speaker device is located on the left of the destination device, and the second speaker device is located on the right of the destination device; when the destination device displays and plays the first projection data through projection, the destination device receives a projection request and second projection data that are sent by a second source device, where the second projection data includes second display data and second audio data; after receiving the second projection data sent by the second source device, the destination device displays the first display data in a first screen subarea of the destination device, displays the second display data in a second screen subarea of the destination device, plays the first audio data by using the first speaker device, and plays the second audio data by using the second speaker device; or after receiving the second projection data sent by the second source device, the destination device displays the first display data in the second screen subarea, displays the second display data in the first screen subarea, plays the first audio data by using the second speaker device, and plays the second audio data by using the first speaker device, where the screen of the destination device includes the first screen subarea and the second screen subarea, the first screen subarea is located on the left of the screen, and the second screen subarea is located on the right of the screen. Display data sent by a source device is a picture that needs to be displayed on the screen of the destination device, and audio data sent by the source device is audio that needs to be played by the speaker device of the destination device.

That is, when only the first source device requests the destination device to perform projection, the destination device plays the first audio data by using all the speaker devices. When both the first source device and the second source device request the destination device to perform projection, the destination device displays the first display data in the first screen subarea, displays the second display data in the second screen subarea, plays the first audio data by using the first speaker device, and plays the second audio data by using the second speaker device, or the destination device displays the first display data in the second screen subarea, displays the second display data in the first screen subarea, plays the first audio data by using the second speaker device, and plays the second audio data by using the first speaker device. In this embodiment of this application, the destination device may dynamically adjust a speaker device corresponding to a screen for a screen area or a screen subarea that is divided for the source device, so that a projectionist associates audio with a video on senses, to improve audio-visual experience.

In a possible implementation, that the destination device displays the first display data on a screen of the destination device includes: The destination device displays the first display data on the screen in full screen mode; or the destination device displays the first display data in the first screen subarea or the second screen subarea; or the destination device displays the first display data in a middle area of the screen.

That is, the destination device displays the first display data on the screen in a plurality of display manners, for example, displaying in full screen mode, displaying in the left or the right screen subarea, or displaying in the middle area of the screen, so that a picture of the first source device may be projected onto the full screen or a part of the screen of the destination device, to implement projection sharing of the first source device.

In a possible implementation, the method further includes: When displaying the first display data on the screen of the destination device, the destination device further displays identification information, where the identification information includes an identifier of the destination device; and after the second source device scans the identification information, the destination device receives the projection request and the second projection data that are sent by the second source device. The identification information may be the identifier of the destination device carried by a quick response (QR) code. For example, the identifier of the destination device may be a medium access control (MAC) address or an Internet Protocol (IP) address of the destination device.

That is, in this embodiment of this application, when the first source device is performing projection, the second source device may scan the identification information displayed on the screen of the destination device to request projection onto the destination device. For example, the second source device scans the QR code displayed on the screen of the destination device, to obtain the identifier of the destination device. Then, the second source device may initiate the projection request to the destination device.

In a possible implementation, the identification information is located on the left or the right of the screen; or the identification information is located in an upper left corner, an upper right corner, a lower left corner, or a lower right corner of the screen; or the identification information floats above a picture that is currently displayed on the screen, or the identification information is displayed in a picture-in-picture manner in the picture currently displayed on the screen.

That is, in this embodiment of this application, the identification information may be displayed on the screen of the destination device, so that a new source device scans the identification information to perform projection. The identification information may be located at a plurality of locations on the screen of the destination device and may be displayed in a plurality of manners. The foregoing is merely an example in a specific scenario, and is not intended to limit this embodiment of this application.

In a possible implementation, if the identification information is located on the right of the screen, or the identification information is located in the upper right corner or the lower right corner of the screen, the destination device displays the first display data in the first screen subarea, displays the second display data in the second screen subarea, plays the first audio data by using the first speaker device, and plays the second audio data by using the second speaker device. Alternatively, if the identification information is located on the left of the screen, or the identification information is located in the upper left corner or the lower left corner of the screen, the destination device displays the first display data in the second screen subarea, displays the second display data in the first screen subarea, plays the first audio data by using the second speaker device, and plays the second audio data by using the first speaker device.

In other words, in this embodiment of this application, the identification information may be displayed on the screen of the destination device, so that a new source device scans the identification information to perform projection. There is a plurality of implementations for the location of the identification information on the screen of the destination device. Different display locations of the identification information on the screen of the destination device may be used to determine a screen subarea in which display data is displayed, or may be used to determine a playing device corresponding to audio data. The foregoing is merely an example in a specific scenario, and is not intended to limit this embodiment of this application.

In a possible implementation, the identification information is a QR code. To be specific, the QR code may carry the identifier of the destination device. For example, the QR code may carry the MAC address, the IP address, or the like of the destination device. The user may scan the QR code by using a code scanning function provided in a mobile phone, to obtain the identifier of the destination device. The mobile phone may establish a communication connection to the destination device based on the identifier of the destination device.

In a possible implementation, the method further includes: When receiving the first projection data sent by the first source device, the destination device receives a projection quit instruction sent by the second source device; and in response to the projection quit instruction of the second source device, the destination device displays the first display data on the screen of the destination device, and plays the first audio data by using all the speaker devices of the destination device.

After receiving the projection quit instruction sent by the second source device, the destination device may further stop displaying the second display data of the second source device, and stop playing the second audio data of the second source device at the same time. In addition, after receiving the projection quit instruction sent by the second source device, the destination device no longer receives the second projection data sent by the second source device.

Alternatively, the first source device may first initiate a projection quit instruction. After receiving the projection quit instruction sent by the first source device, the destination device may stop playing the projection data of the first source device, and continue playing the projection data of the second source device. The destination device may play the display data of the second source device in the first screen subarea, the second screen subarea, or in full screen, and play the audio data of the second source device by using all the speaker devices.

That is, after a source device initiates a request to the destination device to join projection, the destination device may display display data of all source devices, and play audio data of all the source devices by using the speaker devices of the destination device. A source device that has joined projection sharing may also quit projection sharing halfway. In this case, the destination device may dynamically receive projection quit instructions sent by one or more source devices. When a quantity of source devices of the destination device changes, a speaker device allocated by the destination device to each screen subarea also dynamically changes. That is, when the second source device quits projection, the destination device no longer allocates a screen subarea to the second source device, and no longer configures a speaker device for the screen subarea corresponding to the second source device. In this case, all the speaker devices still play the audio data of the first source device. In this way, the projectionist associates audio with a video on senses, to improve audio-visual experience.

In a possible implementation, there are one or more first speaker devices and/or one or more second speaker devices. The first speaker device and/or the second speaker device are/is built-in audio modules/a built-in audio module of the destination device, or the first speaker device and/or the second speaker device are/is external audio modules or speakers/an external audio module or speaker of the destination device. That is, in this embodiment of this application, the speaker device of the destination device may be provided inside or outside the destination device, and a speaker device corresponding to the screen may be dynamically adjusted by using a plurality of forms of speaker devices, so that the projectionist associates audio with a video on senses, to improve audio-visual experience.

According to a second aspect, an embodiment of this disclosure further provides a projected audio and video playing method, including: A destination device determines a mapping relationship between a speaker device and a screen subarea divided in the destination device for projection display, where the mapping relationship includes: a quantity of screen subareas divided in the destination device for projection display, and a quantity of speaker devices and a location of the speaker device that correspond to each screen subarea; the destination device allocates a first screen subarea used during projection to a first source device, and determines, based on the mapping relationship, a first speaker device corresponding to the first screen subarea; the destination device receives first display data and first audio data that are sent by the first source device; and the destination device displays the first display data in the first screen subarea in the projection interface, and plays the first audio data by using the first speaker device.

That is, when the first source device requests projection onto the destination device, the destination device may determine the corresponding first speaker device based on the first screen subarea that is allocated to the first source device, to display the first display data in the first screen subarea in the projection interface, and play the first audio data by using the first speaker device. In this embodiment of this application, the destination device may dynamically adjust a speaker device corresponding to a screen for a screen area or a screen subarea that is divided for the source device, so that a projectionist associates audio with a video on senses, to improve audio-visual experience.

In a possible implementation, that a destination device determines a mapping relationship between a speaker device and a screen subarea divided in the destination device for projection display includes: If two or more speaker devices are provided inside the destination device, the destination device obtains, during initialization, the mapping relationship between a speaker device and a screen subarea divided in the destination device for projection display; or when the destination device is connected to two or more external speaker devices, the destination device obtains, when the connection succeeds, the mapping relationship between a speaker device and a screen subarea divided in the destination device for projection display. That is, in this embodiment of this application, the speaker device of the destination device may be provided inside or outside the destination device, and a speaker device corresponding to the screen may be dynamically adjusted by using a plurality of forms of speaker devices, so that the projectionist associates audio with a video on senses, to improve audio-visual experience.

In a possible implementation, that the destination device allocates a first screen subarea used during projection to a first source device, and determines, based on the mapping relationship, a first speaker device corresponding to the first screen subarea includes: When determining that the first source device is the first projected source device, the destination device determines that a full-screen area of the projection interface is the first screen subarea; and the destination device determines that the first speaker device is all speaker devices connected to the destination device. That is, the destination device displays the first display data on the screen in a plurality of display manners, for example, full-screen display, so that a picture of the first source device may be projected onto the full screen of the destination device. Unlimitedly, when displaying the first display data on the screen, the destination device may alternatively display the first display data in a screen subarea on the left or the right, or in a middle area of the screen, so that the picture of the first source device may be projected onto the full screen or a part of the screen of the destination device, to implement projection sharing of the first source device.

In a possible implementation, after the destination device displays the first display data in the first screen subarea in the projection interface, and plays the first audio data by using the first speaker device, the method further includes: When determining that the first source device is performing projection and a second source device joins projection, the destination device allocates a second screen subarea used for projection to the first source device and a third screen subarea used for projection to the second source device; the destination device determines, based on the mapping relationship, a second speaker device corresponding to the second screen subarea and a third speaker device corresponding to the third screen subarea; the destination device receives second display data and second audio data that are sent by the first source device, and receives third display data and third audio data that are sent by the second source device; and the destination device displays the second display data in the second screen subarea in the projection interface, displays the third display data in the third screen subarea, plays the second audio data by using the second speaker device, and plays the third audio data by using the third speaker device.

That is, in this embodiment of this application, the destination device determines that the first source device is performing projection, and the second source device joins projection. That is, the destination device determines that both the two source devices need to perform projection. In this case, the destination device may reallocate a screen subarea and a speaker device corresponding to each screen subarea to each of the two source devices, and finally displays display data of each source device in the redivided screen subarea and plays audio data of each source device by using the reconfigured speaker device, so that the projectionist associates audio with a video on senses, to improve audio-visual experience.

In a possible implementation, after the destination device displays the second display data in the second screen subarea in the projection interface, displays the third display data in the third screen subarea, plays the second audio data by using the second speaker device, and plays the third audio data by using the third speaker device, the method further includes: When determining that the first source device is performing projection and the second source device requests the destination device to quit projection, the destination device allocates the first screen subarea used during projection to the first source device, and determines, based on the mapping relationship, the first speaker device corresponding to the first screen subarea; the destination device receives the first display data and the first audio data that are sent by the first source device; and the destination device displays the first display data in the first screen subarea in the projection interface, and plays the first audio data by using the first speaker device.

That is, the destination device may dynamically receive display data and audio data that are sent by one or more source devices, and perform projected audio playing. When a quantity of source devices of the destination device changes, when each source device performs projection onto the destination device, a speaker device allocated by a smart TV to each screen subarea also changes dynamically. In addition, a source device that has joined projection sharing may also quit projection sharing halfway. In this case, the destination device may dynamically receive projection quit instructions sent by one or more source devices. When the quantity of source devices of the destination device changes, when each source device performs projection onto the destination device, the speaker device allocated by the smart TV to each screen subarea also changes dynamically.

In a possible implementation, after the destination device displays the first display data in the first screen subarea in the projection interface, and plays the first audio data by using the first speaker device, the method further includes: When determining that the first source device is performing projection and a second source device joins projection, the destination device allocates a third screen subarea used during projection to the second source device, and determines, based on the mapping relationship, a third speaker device corresponding to the third screen subarea; the destination device receives the first display data and the first audio data that are sent by the first source device, and receives third display data and third audio data that are sent by the second source device; the destination device displays the first display data in the first screen subarea in the projection interface, and displays the third display data in the second screen subarea; and the destination device plays the first audio data by using the first speaker device, and plays the third audio data by using the third speaker device.

That is, in this embodiment of this application, the destination device determines that the first source device is performing projection, and the second source device joins projection. That is, the destination device determines that both the two source devices need to perform projection. In this case, the destination device allocates only a screen subarea and a speaker device corresponding to the screen subarea to a newly added second source device, instead of changing the screen subarea for the first source device and the corresponding speaker device. Finally, the destination device may play the display data and the audio data of each source device by using the divided screen subarea and the configured speaker device, so that the projectionist associates audio with a video on senses, to improve audio-visual experience.

In a possible implementation, that the destination device allocates a third screen subarea used during projection to the second source device includes: The destination device receives a projection instruction sent by the second source device, where the projection instruction is sent when the second source device obtains a projection identifier from the projection interface; and the destination device determines the third screen subarea based on a location that is of the projection identifier in the projection interface and obtained by the second source device.

That is, in this embodiment of this application, when the first source device is performing projection, the second source device may scan the projection identifier displayed on the screen of the destination device to request projection onto the destination device. For example, the second source device scans a QR code displayed on the screen of the destination device, to obtain an identifier of the destination device. Then, the second source device may initiate a projection request to the destination device.

According to a third aspect, this disclosure provides an electronic device, where the electronic device is a destination device during projection. The destination device includes: a display; a communication module; speaker devices, where the speaker devices include a first speaker device and a second speaker device, the first speaker device is located on the left of the destination device, and the second speaker device is located on the right of the destination device; one or more processors; one or more memories; and one or more computer programs, where the one or more computer programs are stored in the one or more memories, and include instructions, and when the instructions are executed by the destination device, the destination device is enabled to perform the method according to any one of the first aspect or the second aspect. Optionally, the first speaker device and the second speaker device may be external speakers of the electronic device. In other words, the electronic device may not include the first speaker device and the second speaker device. The first speaker device and the second speaker device are external speaker devices, and the two speakers are connected (physically connected or wirelessly connected) to the electronic device. In this case, according to the method in the foregoing embodiment, the electronic device controls a corresponding speaker device to perform playing. In addition, when the external speaker is connected to the electronic device, the electronic device may prompt a user to place the external speaker in an appropriate position, for example, place one external speaker on the left of the electronic device, and place the other external speaker on the right of the electronic device. Therefore, when playing projected audio of two source devices, the electronic device can play different audio through the two external speakers separately.

According to a fourth aspect, this disclosure provides a computer storage medium, including computer instructions. When the computer instructions are run on an electronic device, the electronic device is enabled to perform the method according to any one of the first aspect and the second aspect and the possible implementations of the first aspect and the second aspect.

According to a fifth aspect, this disclosure provides a computer program product. When the computer program product runs on an electronic device, the electronic device is enabled to perform the method according to any one of the first aspect and the second aspect and the possible implementations of the first aspect and the second aspect.

It may be understood that the electronic device in the third aspect, the computer storage medium in the fourth aspect, and the computer program product in the fifth aspect that are provided above are all configured to perform the corresponding methods provided above. Therefore, for beneficial effects that can be achieved by the electronic device, the computer storage medium, and the computer program product, refer to beneficial effects in the corresponding methods provided above. Details are not described herein again.

DESCRIPTION OF EMBODIMENTS

The following describes embodiments of this disclosure with reference to accompanying drawings.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
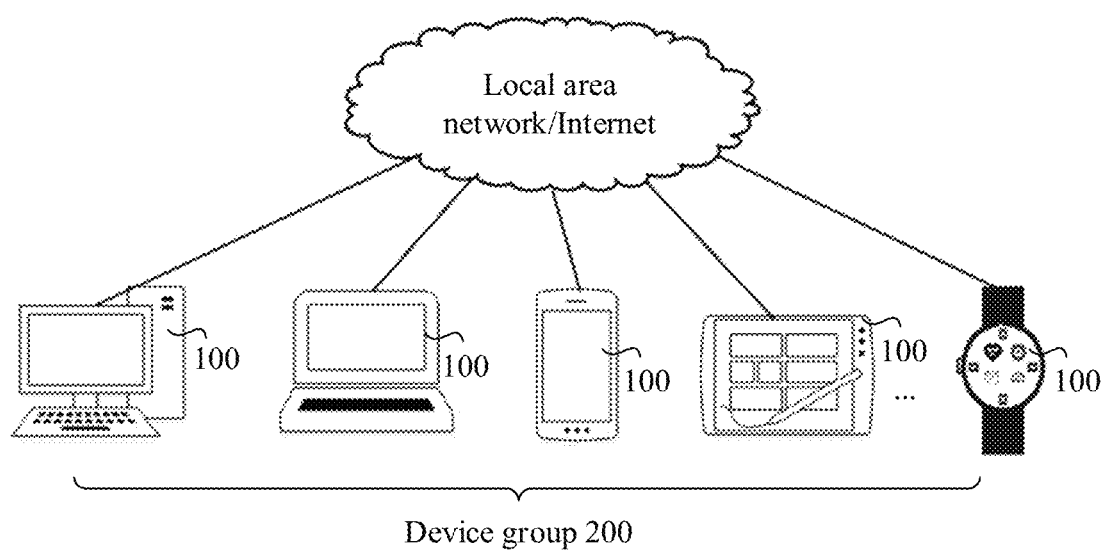
FIG. 1 is a diagram 1 of a scenario architecture of a projected audio playing system according to an embodiment of this application.

A projected audio and video playing method provided in embodiments of this disclosure may be applied to a device group 200 shown in FIG. 1. Electronic devices 100 in the device group 200 may communicate with each other through a local area network (LAN) or a wide area network (WAN).

For example, a plurality of devices such as a mobile phone, a tablet computer, a desktop computer, a smartwatch, a notebook computer, a large-screen device (for example, a smart TV or another electronic device with a larger screen and capable of playing audio and video files), and a speaker of a user may be used as a device group 200. When the user logs in to these devices by using a same account, these devices may communicate with each other through the wide area network.

For another example, a plurality of devices such as a mobile phone, a tablet computer, a desktop computer, a smartwatch, a notebook computer, a large-screen device, and a speaker of a user may be connected to a same router. In this case, these devices can communicate with each other through a LAN provided by the router.

For another example, the plurality of electronic devices 100 may alternatively establish a peer-to-peer network (also referred to as a P2P network) through wireless communication (for example, BLUETOOTH, WI-FI, or a ZIGBEE network). For example, a user may add a plurality of electronic devices to one WI-FI network. The electronic devices 100 in the WI-FI network form a P2P network, and all devices in the P2P network are members of the device group 200.

Certainly, the electronic devices 100 in the device group 200 may alternatively be interconnected through a cellular network, or the electronic devices 100 may be interconnected through a transfer device (for example, a Universal Serial Bus (USB) cable or a dock device), to implement a communication function between the electronic devices 100 in the device group 200. This is not limited in embodiments of the present disclosure.

In embodiments of this application, one or more electronic devices 100 in the device group 200 may be used as source devices, and one or more electronic devices 100 in the device group 200 may be used as destination devices. The source device may project display content on a display interface of the source device onto the destination device for display. In addition, the source device may further send audio data to the destination device for playing.

Figures 2A, 2B:
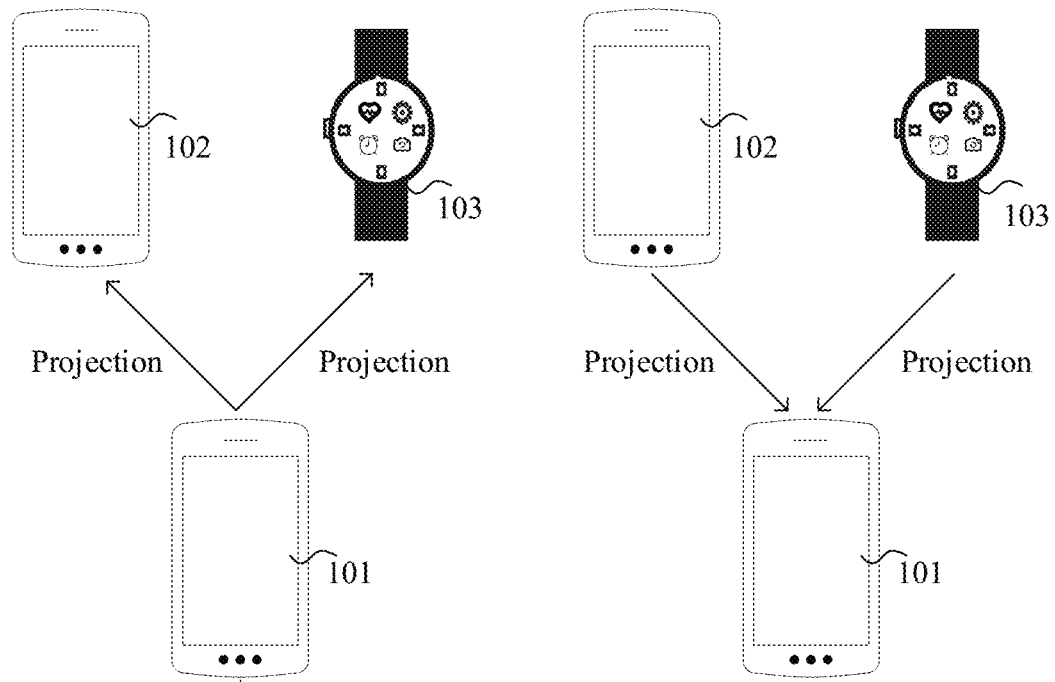
FIG. 2A and FIG. 2B are a diagram 2 of a scenario architecture of a projected audio playing system according to an embodiment of this application.

For example, as shown in FIG. 2A, an electronic device 101 is used as a source device, and both an electronic device 102 and an electronic device 103 may be used as destination devices of the electronic device 101. The electronic device 101 may project display content in a display interface of the electronic device 101 onto both the electronic device 102 and the electronic device 103 for display. In other words, one source device may simultaneously perform projected audio playing to a plurality of destination devices. In addition, the source device may also project the audio data onto the destination device for playing.

Alternatively, as shown in FIG. 2B, an electronic device 101 is used as a destination device, and both an electronic device 102 and an electronic device 103 may be used as source devices of the electronic device 101. In this case, the electronic device 102 and the electronic device 103 may simultaneously project display content in display interfaces of the electronic device 102 and the electronic device 103 onto the electronic device 101 for display. In other words, one destination device may receive and display display content sent by a plurality of source devices.

In addition, the source device may also project audio data onto the destination device for playing. For example, an example is described with reference to FIG. 2B. The electronic device 102 and the electronic device 103 may further send respective audio data to the electronic device 101. When displaying video content, the electronic device 101 synchronously plays the audio data of each source device. In this embodiment of this application, the electronic device 101 may play the audio data through a plurality of speaker devices. For example, the speaker device may be an external speaker independent of the electronic device 101, or may be a sound module disposed inside the electronic device 101. The electronic device 101 may play the audio data of the electronic device 102 and the audio data of the electronic device 103 through different speaker devices. When the electronic device 102 and the electronic device 103 share audio and videos with the same electronic device 101, the audio data can be dynamically and adaptively output based on a video adding location.

In a many-to-one audio and video sharing scenario, for example, in a two-to-one projection scenario, a screen of the electronic device 101 may be divided into a left and a right part, and each piece of projected content is displayed on one part of the screen. For example, one piece of projected content is displayed on the left part of the screen, and another piece of projected content is displayed on the right part of the screen. If the electronic device 101 is configured with a left speaker device and a right speaker device, to make a projectionist to focus audio-visual experience on the user's side in multi-sensory multi-dimensional dimensions, corresponding audio data needs to be played on the user's side, and impact of the audio data on the other side on the user is weakened. That is, audio corresponding to content displayed on the left part of the screen is played in the left speaker device, and audio corresponding to content displayed on the right part of the screen is played in the right speaker device.

In some embodiments of this application, the electronic device 102 is a mobile phone terminal operated by a projectionist 1, and the electronic device 103 is a mobile phone terminal operated by a projectionist 2. The two projectionists stand in front of a same large screen. For example, the two projectionists are separately located on the left and right of the large screen, and perform projection. A screen of the electronic device 101 is divided into left and right parts, and the electronic device 101 includes a left speaker device and a right speaker device. There is a mapping relationship between a screen picture and a speaker. The left speaker is mapped and mounted to a left screen subarea, and the right speaker is mapped and mounted to a right screen subarea. Therefore, the user can focus on sensory experience of projection on the user's side, and can use the large screen to improve projection sharing experience.

In some embodiments, specific structures of the electronic devices in the foregoing device group 200 may be the same or may be different.

For example, each electronic device may be a mobile phone, a tablet computer, a smart TV, a wearable electronic device, a head unit, a laptop computer, an ultra-mobile personal computer (UMPC), a handheld computer, a netbook, a personal digital assistant (PDA), and a virtual reality device. This is not limited in embodiments of this application.

Figure 3:
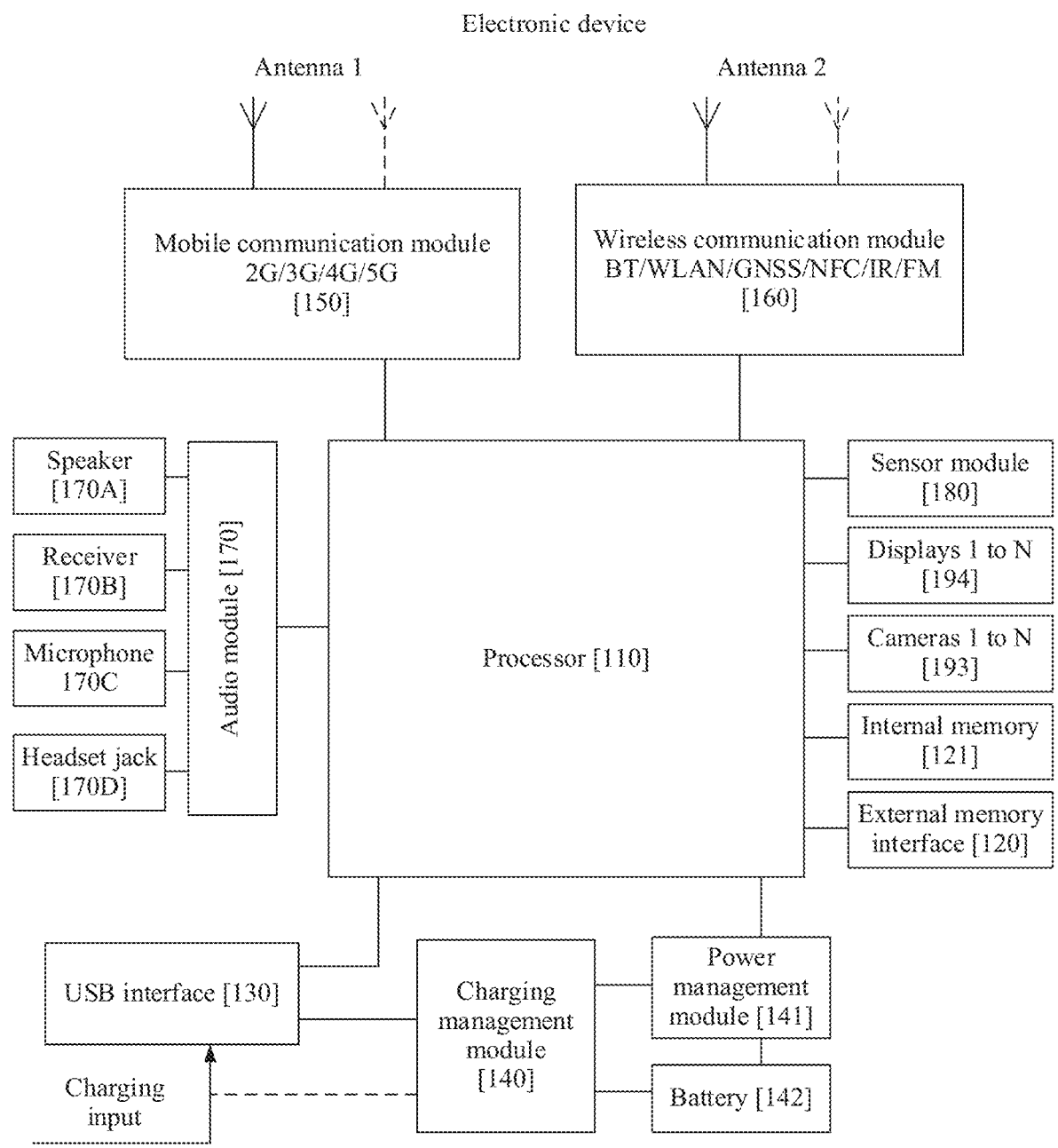
FIG. 3 is a schematic diagram 1 of a structure of an electronic device according to an embodiment of this application.

For example, FIG. 3 is a schematic diagram of a structure of an electronic device.

The electronic device may include a processor 110, an external memory interface 120, an internal memory 121, a USB interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a camera 193, a display 194, and the like.

It may be understood that the structure shown in this embodiment of this disclosure does not constitute a specific limitation on the electronic device. In some other embodiments of this application, the electronic device may include more or fewer components than those shown in the figure, or some components may be combined, or some components may be split, or there may be a different component layout. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device. The charging management module 140 may further supply power to the electronic device by using the power management module 141 when the battery 142 is charged.

The power management module 141 is configured to connect to the battery 142, the charging management module 140, and the processor 110. The power management module 141 receives input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution that is for wireless communication including second generation (2G)/third generation (3G)/fourth generation (4G)/fifith generation (5G) and the like and that is used in the electronic device. The mobile communication module 150 may include one or more filters, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an speaker device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same component with the mobile communication module 150 or another function module.

The wireless communication module 160 may provide a wireless communication solution that is applied to the electronic device and that includes a wireless local area network (WLAN) (for example, a WI-FI network, BLUETOOTH, a global navigation satellite system (GNSS), frequency modulation (FM), a near field communication (NFC) technology, and an infrared (IR) technology. The wireless communication module 160 may be one or more components integrating one or more communication processor modules. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 of the electronic device is coupled to the mobile communication module 150, and the antenna 2 is coupled to the wireless communication module 160, so that the electronic device can communicate with a network and another device by using a wireless communication technology. The wireless communication technology may include a Global System for Mobile Communications (GSM), a General Packet Radio Service (GPRS), code division multiple access (CDMA), wideband code division multiple access (WCDMA), time-division code division multiple access (TD-SCDMA), Long-Term Evolution (LTE), BLUETOOTH, a GNSS, a WLAN, NFC, FM, an IR technology, and/or the like. The GNSS may include a Gobal Positioning System (GPS), a global navigation satellite system (GLONASS), a BEIDOU navigation satellite system (BDS), a Quasi-Zenith Satellite System (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1.

The electronic device may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. Therefore, the electronic device may play or record videos in a plurality of coding formats, for example, Moving Picture Experts Group (MPEG)-1, MPEG-2, MPEG-3, and MPEG-4.

The external memory interface 120 may be configured to connect to an external storage card, for example, a micro SD card, to extend a storage capability of the electronic device. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the foregoing instructions stored in the internal memory 121, so that the electronic device is enabled to perform the projected audio and video playing method provided in some embodiments of this application, various functional applications, data processing, and the like. The internal memory 121 may include a program storage area and a data storage area. The program storage area may store an operating system. The program storage area may further store one or more applications (for example, Gallery and Contacts), and the like. The data storage area may store data (for example, Photos and Contacts) created during use of the electronic device. In addition, the internal memory 121 may include a high-speed random-access memory (RAM), and may further include a non-volatile memory, for example, one or more disk storage components, a flash component, or a Universal Flash Storage (UFS). In some other embodiments, the processor 110 runs the instructions stored in the internal memory 121 and/or the instructions stored in the memory disposed in the processor, to enable the electronic device to perform the projected audio and video playing method provided in some embodiments of this application, various functional applications, data processing, and the like.

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110. A plurality of audio modules 170 are disposed in the electronic device and are arranged in a plurality of manners. For example, an even number (for example, 2N, where N is a positive integer) of audio modules 170 are disposed in the electronic device, which are a left audio module array and a right audio module array. For another example, an odd number (for example, 2N+1, where N is a positive integer) of audio modules 170 are disposed in the electronic device, which are a left audio module array, a middle audio module array, and a right audio module array.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call or sending voice information, the user may make a sound by moving a human mouth close to the microphone 170C to input a sound signal to the microphone 170C. One or more microphones 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5 millimeter (mm) Open Mobile Terminal Platform (OMTP) standard interface or a Cellular Telecommunications Industry Association of the USA (CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like. The touch sensor may be disposed on the display. The touch sensor and the display form a touchscreen that is also referred to as a "touch screen".

In addition, the electronic device may further include one or more components such as a button, a motor, an indicator, and a SIM card interface. This is not limited in embodiments of this application.

The following describes in detail a projected audio and video playing method provided in an embodiment of this disclosure with reference to the accompanying drawings. In this embodiment of this application, a plurality of source devices may share audio and videos with one or more destination devices. The following uses an example in which a plurality of source devices shares audio and videos with one destination device for description. For a case in which a plurality of source devices shares audio and videos with a plurality of destination devices, refer to the embodiment in which the plurality of source devices shares audio and videos with one destination device. This is not limited herein.

When the plurality of source devices shares the audio and videos with one destination device, audio data of each source device can be dynamically adapted in an audio output direction of the destination device based on video adding locations. The destination device may establish a topology mapping relationship between a subarea divided on a screen and a connected speaker device (including but not limited to an integrated speaker device and an external speaker). When an audio and video sharer dynamically joins or quits projection sharing, the audio output direction can dynamically and adaptively change based on the established mapping relationship.

Figure 4:
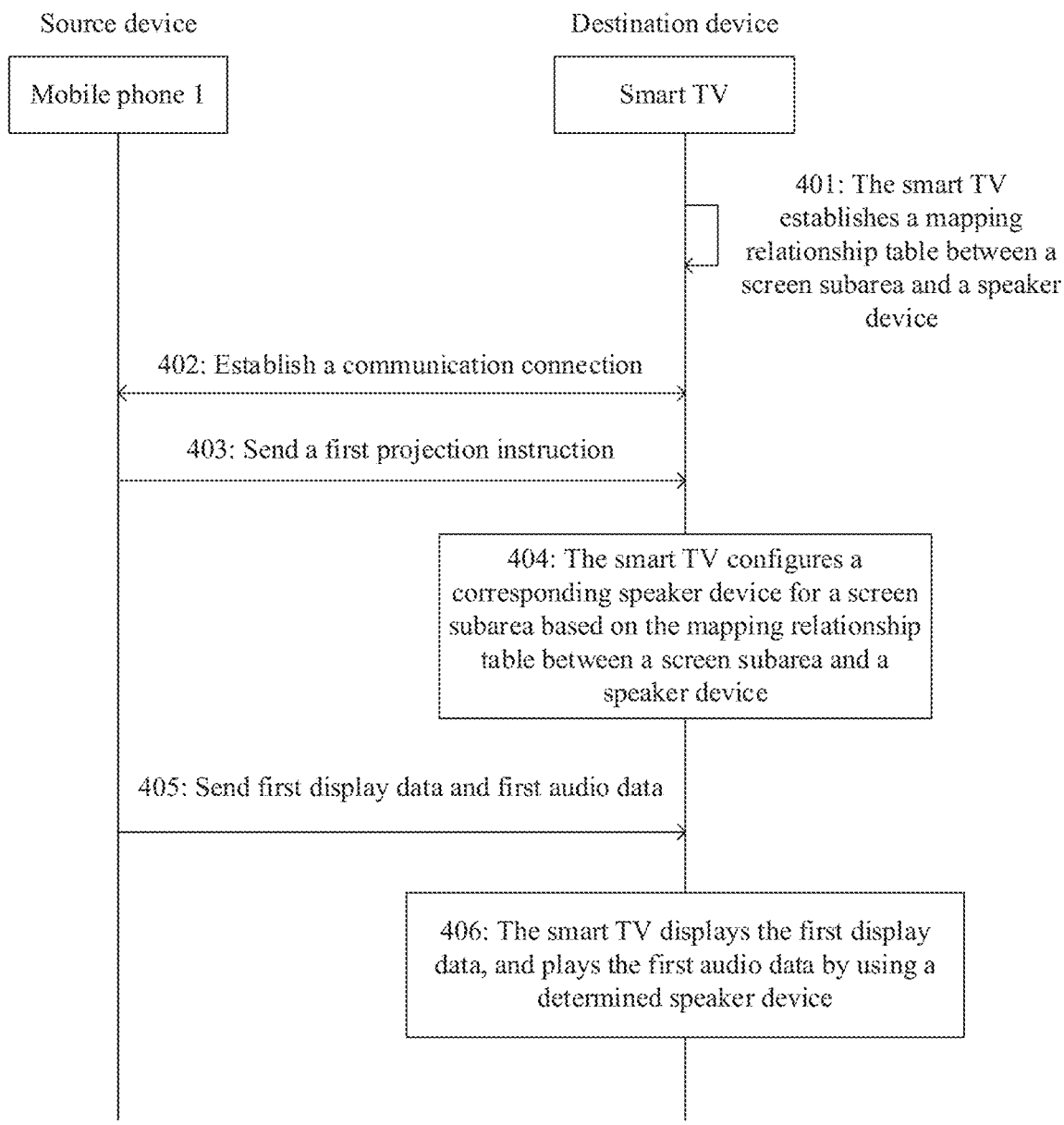
FIG. 4 is a schematic interaction diagram 1 of a projected audio and video playing method according to an embodiment of this application.

As shown in FIG. 4, an example in which a destination device is a smart TV and a source device is a mobile phone during projection is used for description. A projected audio and video playing method provided in an embodiment of this disclosure includes the following steps.

Step 401: The smart TV establishes a mapping relationship table between a screen subarea and a speaker device based on a quantity of screen subareas that need to be displayed on a screen.

In this embodiment of this application, the smart TV is a destination device for projection sharing. The smart TV has an intelligent large screen, and the large screen may be used for display of video content and picture content of the source device. The intelligent large screen may be divided into one or more screen subareas based on different quantities of source devices that need projection sharing. A quantity of screen subareas is not limited. For example, there may be one screen area. That is, one screen area occupies the full screen. For another example, there may be two screen subareas. That is, the large screen may be divided into left and right screen subareas. For still another example, there may be three screen subareas. That is, the large screen may be divided into left, middle, and right screen subareas.

It should be noted that, in step 401, the smart TV may establish the mapping relationship table based on the quantity of screen subareas obtained through division before the mobile phone initiates projection, or may establish the mapping relationship table during initialization of the smart TV. For example, the mapping relationship table may be preconfigured when the smart TV is delivered from the factory. A specific implementation of establishing the mapping relationship table in step 401 by the smart TV is not limited herein.

In this embodiment of this application, the smart TV may not only perform projection sharing of a video and a picture on the large screen, but also perform projection sharing of audio on the large screen. The smart TV may use two or more speaker devices. For example, two or more speaker devices may be built in the smart TV, or two or more external speaker devices are connected to the smart TV. That is, a speaker device configured to play audio data of the source device may be an audio module inside the smart TV, or may be an independent speaker outside the smart TV.

Figure 5A:
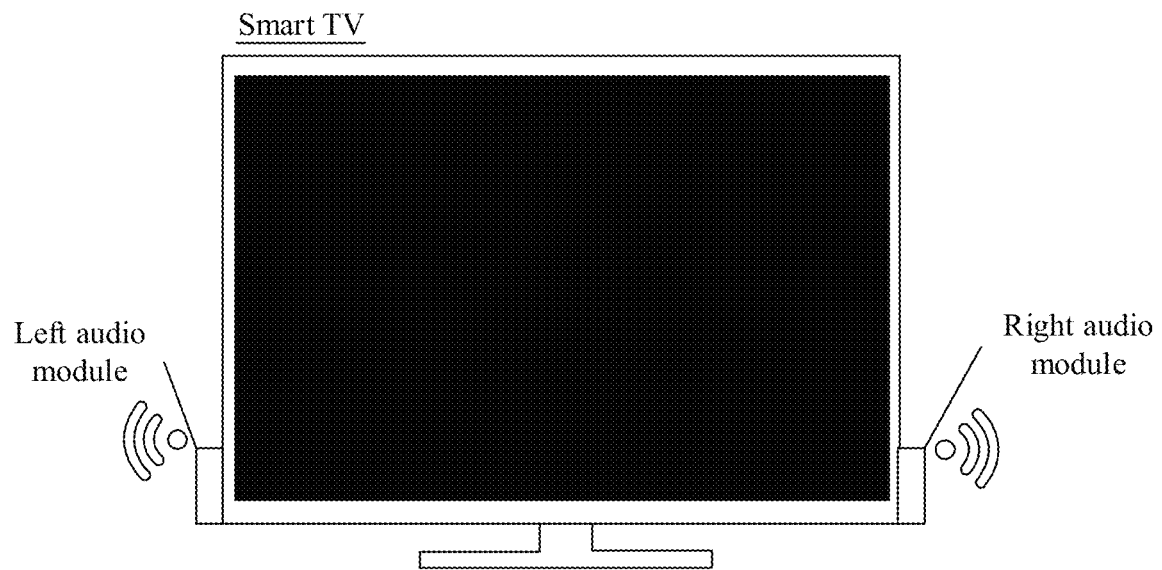
FIG. 5A to FIG. 5F are a schematic diagram 1 of an application scenario of a projected audio and video playing method according to an embodiment of this application.

As shown in FIG. 5A, when the speaker device is built in the smart TV, the speaker device may be an audio module. For example, a left audio module and a right audio module are built in the smart TV. Unlimitedly, two or more audio modules may be included inside the smart TV. A binding relationship between a screen subarea and a speaker device is preset before the smart TV is delivered from the factory. For example, when projected content of only one source device is displayed, the left and right audio modules are used at the same time. When projected content of two source devices is separately displayed in a left screen subarea and a right screen subarea, the left audio module plays audio of the content displayed in the left screen subarea, and the right audio module plays audio of the content displayed in the right screen subarea.

Figure 5B:
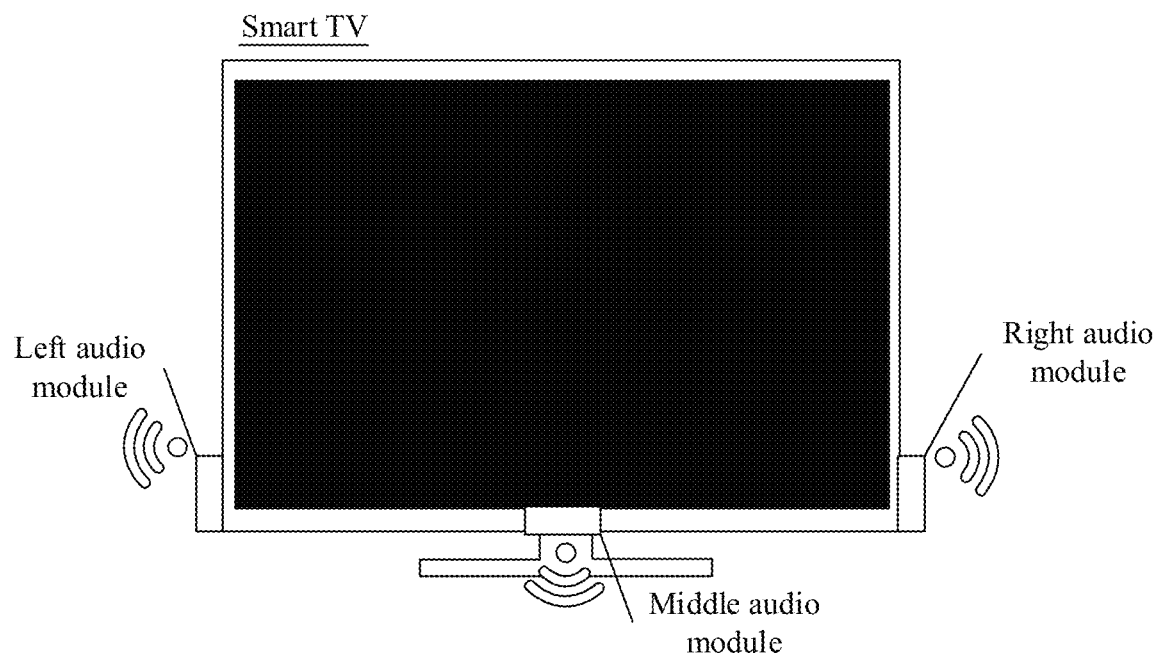

As shown in FIG. 5B, when the speaker device is built in the smart TV, the speaker device may be an audio module. For example, a left audio module, a middle audio module, and a right audio module are built in the smart TV. A binding relationship between a screen subarea and a speaker device is preset before the smart TV is delivered from the factory. For example, when projected content of only one source device is displayed, the left, middle, and right audio modules are used at the same time. When projected content of three source devices is separately displayed in a left screen subarea, a middle screen subarea, and a right screen subarea, the left audio module plays audio of the content displayed in the left screen subarea, the middle audio module plays audio of the content displayed in the middle screen subarea, and the right audio module plays audio of the content displayed in the right screen subarea.

Figure 5C:
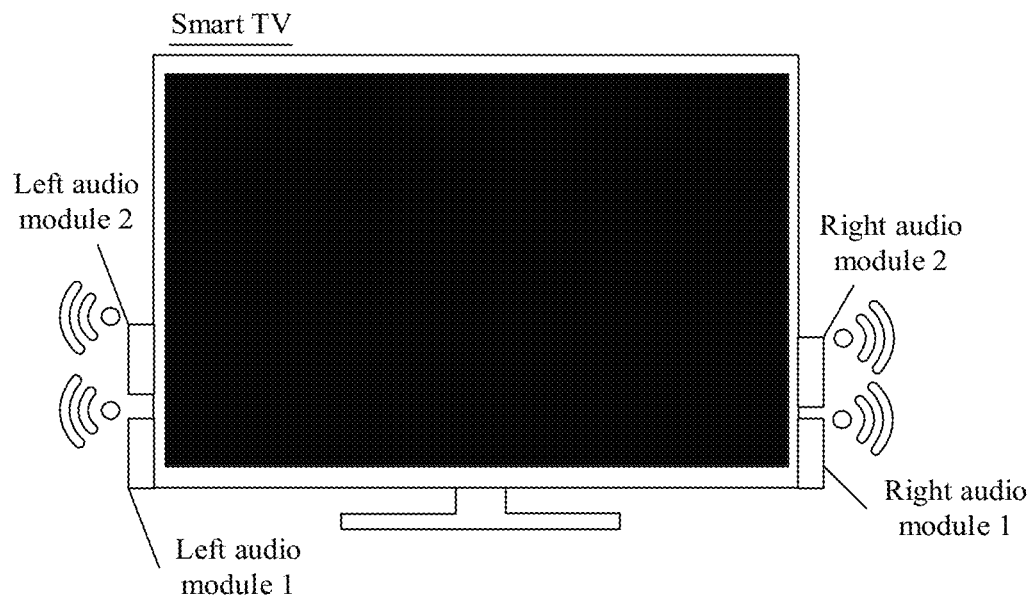

A plurality of audio modules may be built in the smart TV. As shown in FIG. 5C, a left audio module array and a right audio module array are built in the smart TV. Each audio module array may include one or more audio modules. As shown in FIG. 5C, the left audio module array may include a left audio module 1 and a left audio module 2. The right audio module array may include a right audio module 1 and a right audio module 2. A binding relationship between a screen subarea and a speaker device is preset before the smart TV is delivered from the factory. For example, when projected content of only one source device is displayed, the left and right audio module arrays are used at the same time. When projected content of two source devices is separately displayed in a left screen subarea and a right screen subarea, the left audio module array plays audio of the content displayed in the left screen subarea, and the right audio module array plays audio of the content displayed in the right screen subarea.

Figure 5D:

As shown in FIG. 5D, the smart TV may alternatively be connected to an external speaker device. In this case, the speaker device is an independent speaker outside the smart TV. When the speaker device is connected to the smart TV, the smart TV can obtain a binding relationship between a screen subarea and a speaker device. In FIG. 5D, an example in which the smart TV is connected to two external speaker devices is used for description. For example, when projected content of only one source device is displayed, a left speaker device and a right speaker device (namely, a speaker device 1 and a speaker device 2) are used at the same time. When projected content of two source devices is separately displayed in a left screen subarea and a right screen subarea, the left speaker device 2 plays audio of the content displayed in the left screen subarea, and the right speaker device 1 plays audio of the content displayed in the right screen subarea.

Figure 5E:
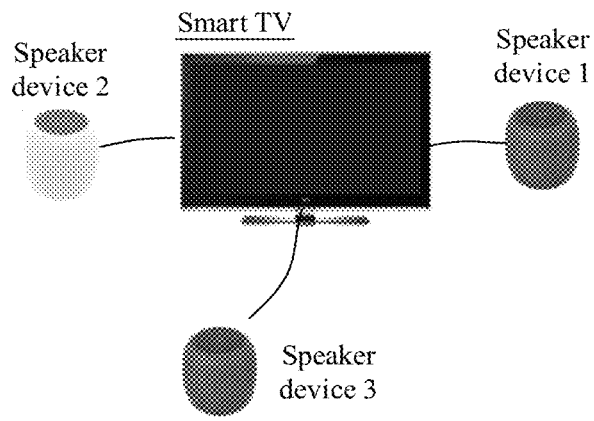

As shown in FIG. 5E, the smart TV may alternatively be connected to an external speaker device. When the speaker device is connected to the smart TV, the smart TV can obtain a binding relationship between a screen subarea and a speaker device. For example, when projected content of only one source device is displayed, a left speaker device, a middle speaker device, and a right speaker device are used at the same time. When projected content of three source devices is separately displayed in a left screen subarea, a middle screen subarea, and a right screen subarea, a left speaker device 2 plays audio of the content displayed in the left screen subarea, a middle speaker device 3 plays audio of the content displayed in the middle screen subarea, and a right speaker device 1 plays audio of the content displayed in the right screen subarea.

Figure 5F:
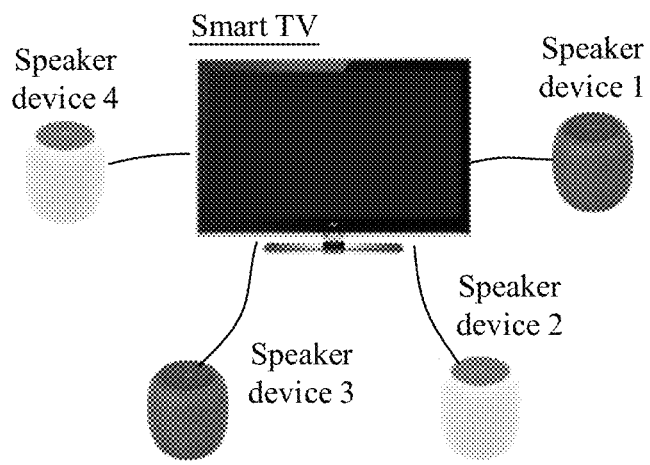

As shown in FIG. 5F, the smart TV may alternatively be connected to an external speaker device. For example, the smart TV is connected to an external left speaker device array and an external right speaker device array. For example, the right speaker device array may include a right speaker device 1 and a right speaker device 2, and the left speaker device array may include a left speaker device 3 and a left speaker device 4. When the speaker device is connected to the smart TV, the smart TV can obtain a binding relationship between a screen subarea and a speaker device. For example, when projected content of only one source device is displayed, the left speaker device array and the right speaker device array are used at the same time. When projected content of two source devices is separately displayed in a left screen subarea and a right screen subarea, the left speaker device array plays audio of the content displayed in the left screen subarea, and the right speaker device array plays audio of the content displayed in the right screen subarea. For example, if the screen is divided into four screen subareas, when projected content of two source devices is separately displayed in two left screen subareas, the left speaker device 3 and the left speaker device 4 separately play audio of the content displayed in the two left screen subareas; and when projected content of two source devices is separately displayed in two right screen subareas, the right speaker device 1 and the right speaker device 2 separately play audio of the content displayed in the two right screen subareas.

In this embodiment of this application, there are a plurality of distribution locations of speaker devices on the smart TV. For example, the speaker devices are distributed on the left and right of the large screen, or the speaker devices are distributed on the left, middle, and right of the large screen, or the speaker devices are distributed around the screen of the smart TV. The distribution location of the speaker device is not limited.

In this embodiment of this application, after determining the screen subareas obtained by dividing the large screen, the smart TV allocates, to each screen subarea, a speaker device connected to the smart TV, and may allocate different speaker devices to different screen subareas. The smart TV establishes the mapping relationship table between a screen subarea and a speaker device based on a relationship between the screen subareas obtained through division and the correspondingly allocated speaker devices.

The mapping relationship table may include: When only one screen area is displayed, all the speaker devices connected to the smart TV are allocated to the screen subarea; or when the screen is divided into two screen subareas, each screen subarea corresponds to one or more speaker devices, and different screen subareas correspond to different speaker devices. For example, a left screen subarea corresponds to one or more left speaker devices, and a right screen subarea corresponds to one or more right speaker devices. When the screen is divided into three screen subareas, each screen subarea corresponds to one or more speaker devices.

For example, a process of establishing the mapping relationship table between a screen subarea and a speaker device is as follows: When there is only one projectionist, speaker devices on the left and right of the large screen are mapped and mounted to a same video display. When there are two projectionists on the left and right, one or more speaker devices on the left of the large screen are mapped and mounted to a left screen subarea, and one or more speaker devices on the right of the large screen are mounted to a right screen subarea. When there are three projectionists on the left, middle, and right, one or more speaker devices on the left of the large screen are mapped and mounted to a left screen subarea, one or more speaker devices in the middle of the large screen are mounted to a middle screen subarea, and one or more speaker devices on the right of the large screen are mounted to a right screen subarea.

Step 402: The smart TV and a mobile phone 1 establish a communication connection.

For example, the smart TV and the mobile phone 1 may establish the communication connection in a wireless manner (for example, BLUETOOTH, WI-FI, or a WLAN direct connection). Alternatively, the smart TV and the mobile phone 1 may establish the communication connection in a wired manner (for example, a USB data cable or a dock device). A communication manner between the smart TV and the mobile phone is not limited.

For example, the smart TV and the mobile phone 1 establish a WI-FI connection. A user may enable WI-FI functions of the smart TV and the mobile phone 1, and the smart TV and the mobile phone 1 access a same WI-FI network. If the user wants to project display content and audio data in the mobile phone 1 onto the smart TV for display, the user may open the smart TV and a projection app installed in the mobile phone 1. For another example, the user may directly tap a projection button in a mobile phone interface, so that the mobile phone 1 initiates the communication connection to the smart TV. The projection button may be, for example, a button in a setting interface, a pull-up menu, a drop-down menu, or a play interface of a video app.

Figure 6:
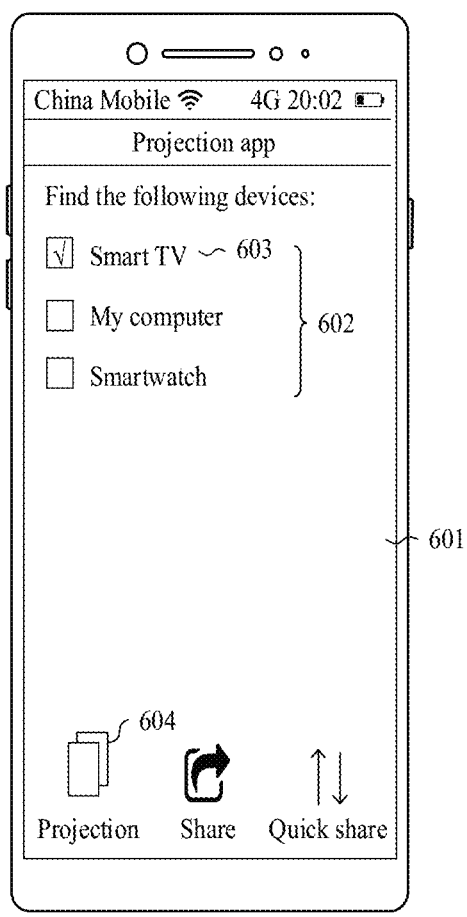
FIG. 6 is a schematic diagram 2 of an application scenario of a projected audio and video playing method according to an embodiment of this application.

As shown in FIG. 6, after the user opens the projection app in the mobile phone 1, the mobile phone 1 may display an interface 601. The mobile phone 1 may display, in the interface 601, a list 602 of found devices in the same WI-FI network. For example, the device list 602 includes an identifier 603 of the smart TV. Further, if it is detected that the user selects the identifier 603 in the device list 602, the mobile phone 1 may establish the WI-FI connection to the smart TV by using a WLAN direct connection function. A manner of establishing communication between the smart TV and the mobile phone 1 through the WI-FI connection is used as an example for description above. This is merely an example herein, and is not intended to limit embodiments of this application.

In addition, after the user selects the identifier 603 in the device list 602, the smart TV may further prompt the user to determine to establish the WI-FI connection to the mobile phone 1. For example, after the smart TV detects that the user determines to establish the WI-FI connection, the mobile phone 1 may establish the WI-FI connection to the smart TV by using the WLAN direct connection function.

In this embodiment of this application, a QR code may be displayed on the large screen of the smart TV, and the user scans the QR code on the large screen by using the mobile phone 1, to establish communication with the smart TV. There are a plurality of manners of displaying the QR code on the large screen of the smart TV. The following separately provides descriptions by using examples.

Figure 7A:
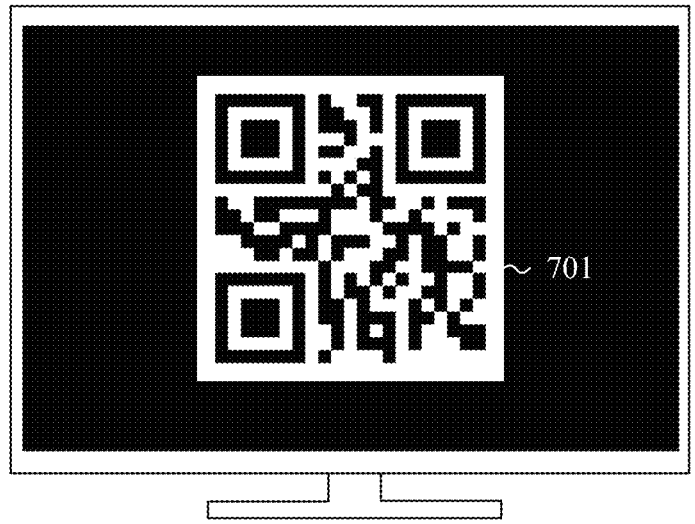
FIG. 7A to FIG. 7J are a schematic diagram 3 of an application scenario of a projected audio and video playing method according to an embodiment of this application.

For example, after the user opens the smart TV and the projection app in the mobile phone 1, as shown in FIG. 7A, the smart TV may display a QR code 701, where the QR code 701 may occupy an entire area of the large screen. That is, the QR code 701 is displayed on the large screen in a full-screen occupation manner. The QR code 701 may carry an identifier of the smart TV, for example, a MAC address or an IP address of the identifier of the TV. Further, the user may scan the QR code 701 by using a code scanning function provided by the projection app in the mobile phone 1, to obtain the identifier of the smart TV. In this way, the mobile phone 1 may establish the WI-FI connection to the smart TV by using the WLAN direct connection function based on the identifier of the smart TV. A manner in which communication can be established between the smart TV and the mobile phone 1 through the WI-FI connection is used as an example for description above. This is merely an example herein, and is not intended to limit embodiments of this application.

After the smart TV and the mobile phone 1 establish the communication connection, the smart TV and the mobile phone 1 form a device group. Members in the device group may be dynamically increased or decreased.

Figure 7B:
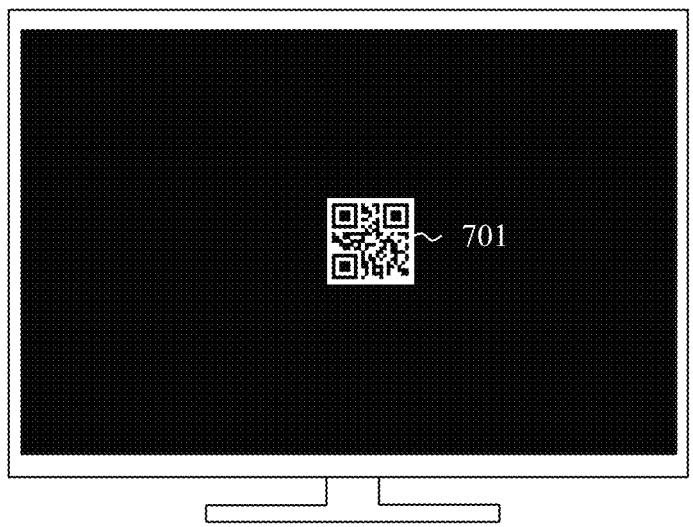

In this embodiment of this application, the source device may join projection by scanning the QR code of the smart TV. An image size and a display location of the QR code on the screen are not limited. As shown in FIG. 7B, the smart TV may display one QR code 701, where the QR code 701 may occupy a partial area of the large screen. For example, the QR code 701 is displayed in a zoomed-out image on the large screen. The QR code 701 may be displayed in the center of the large screen in a centered and zoomed-out manner.

Figure 7C:
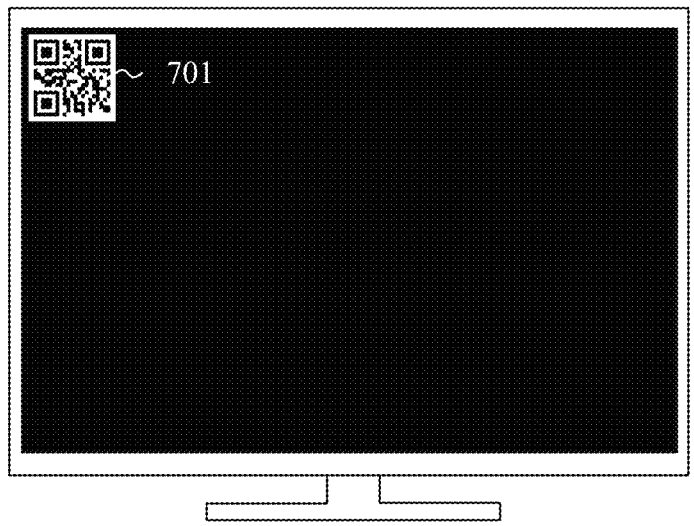

As shown in FIG. 7C, the smart TV may display one QR code 701, where the QR code 701 may occupy a partial area of the large screen. For example, the QR code 701 is displayed in a zoomed-out image on the large screen. The QR code 701 may be displayed in an upper left corner of the large screen in a left-aligned and zoomed-out manner.

Figure 7D:
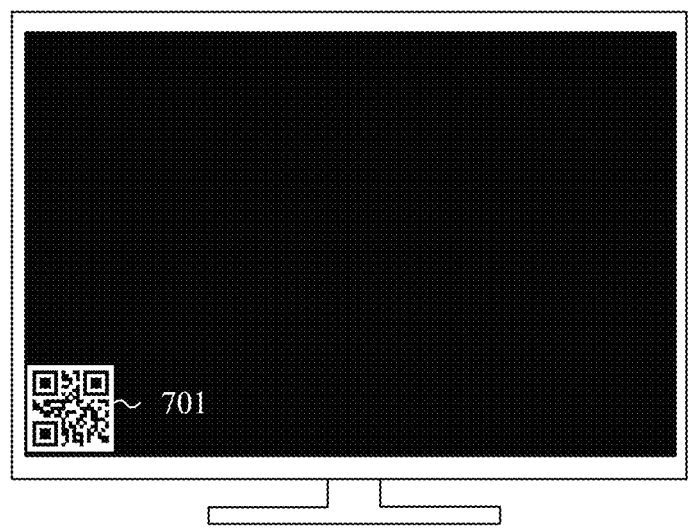

As shown in FIG. 7D, the smart TV may display one QR code 701, where the QR code 701 may occupy a partial area of the large screen. For example, the QR code 701 is displayed in a zoomed-out image on the large screen. The QR code 701 may be displayed in a lower left corner of the large screen in a left-aligned and zoomed-out manner.

Figure 7E:
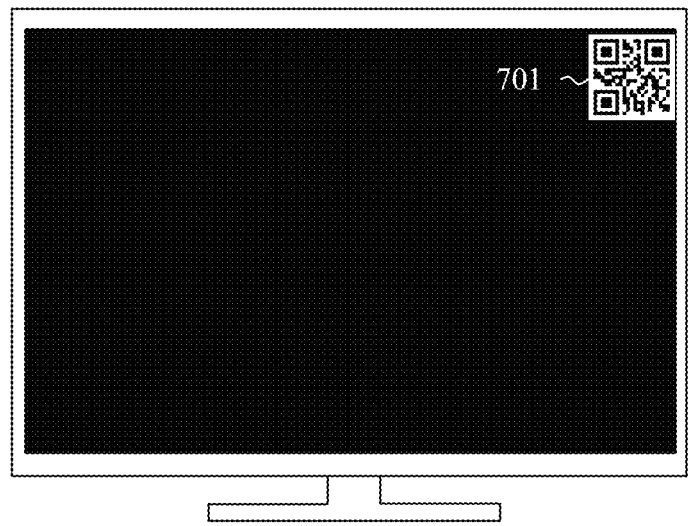

As shown in FIG. 7E, the smart TV may display one QR code 701, where the QR code 701 may occupy a partial area of the large screen. For example, the QR code 701 is displayed in a zoomed-out image on the large screen. The QR code 701 may be displayed in an upper right corner of the large screen in a right-aligned and zoomed-out manner.

Figure 7F:
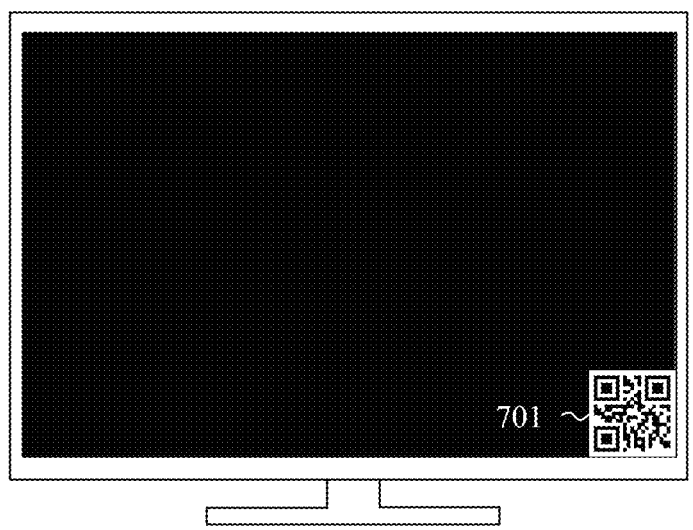

As shown in FIG. 7F, the smart TV may display one QR code 701, where the QR code 701 may occupy a partial area of the large screen. For example, the QR code 701 is displayed in a zoomed-out image on the large screen. The QR code 701 may be displayed in a lower right corner of the large screen in a right-aligned and zoomed-out manner.

Figure 7G:
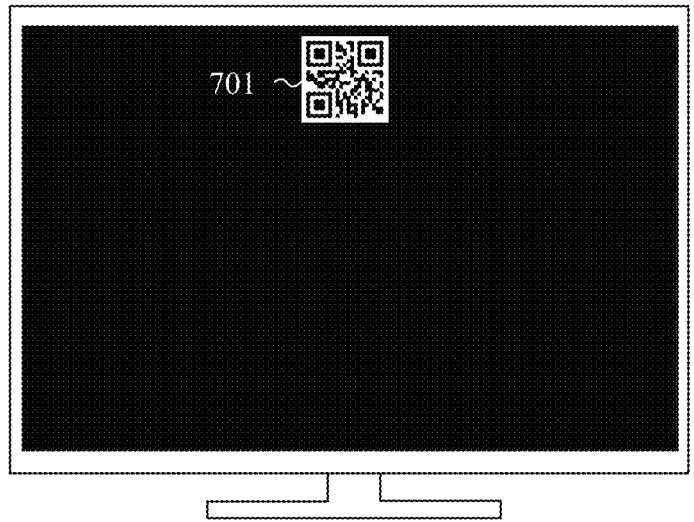

As shown in FIG. 7G, the smart TV may display one QR code 701, where the QR code 701 may occupy a partial area of the large screen. For example, the QR code 701 is displayed in a zoomed-out image on the large screen. The QR code 701 may be displayed at the top of the large screen in a centered and zoomed-out manner.

Figure 7H:
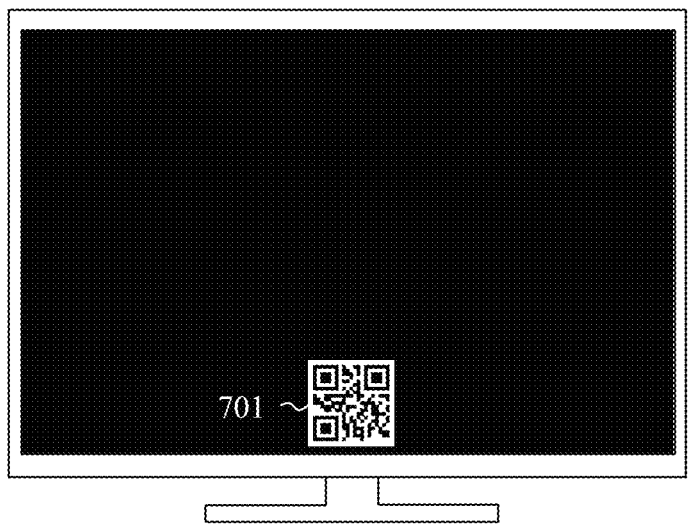

As shown in FIG. 7H, the smart TV may display one QR code 701, where the QR code 701 may occupy a partial area of the large screen. For example, the QR code 701 is displayed in a zoomed-out image on the large screen. The QR code 701 may be displayed at the bottom of the large screen in a centered and zoomed-out manner.

Unlimitedly, in this embodiment of this application, the QR code may be located in the center of the large screen, on the right of the large screen, on the left of the large screen, at the top of the large screen, or at the bottom of the large screen. The manner of displaying the QR code on the large screen may be set with reference to an application scenario. In addition, the QR code may be displayed on the large screen in another manner. For example, the QR code may float on the screen. Optionally, in an interface for displaying the QR code, a related introduction picture may be further displayed, so that the user learns how to use a corresponding projection function.

In addition, the manner of displaying the QR code on the smart TV is not limited either. For example, the QR code may be displayed in a pop-up box, or may be displayed from dark to bright after a display instruction is received, or may be displayed with a watermark.

Figure 7I:
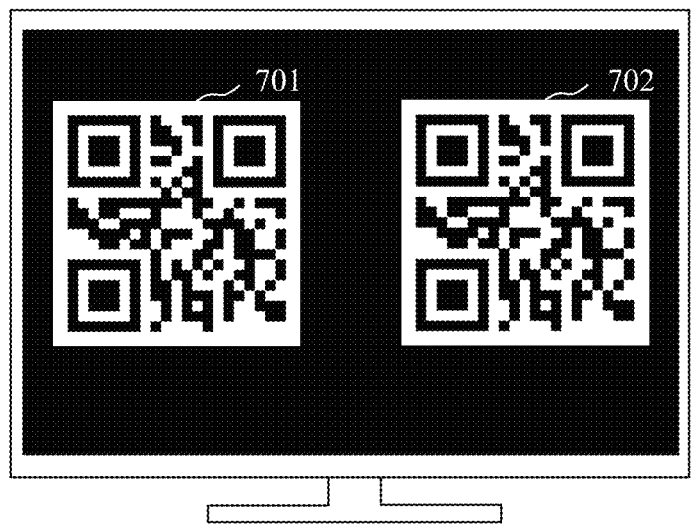
Figure 7J:
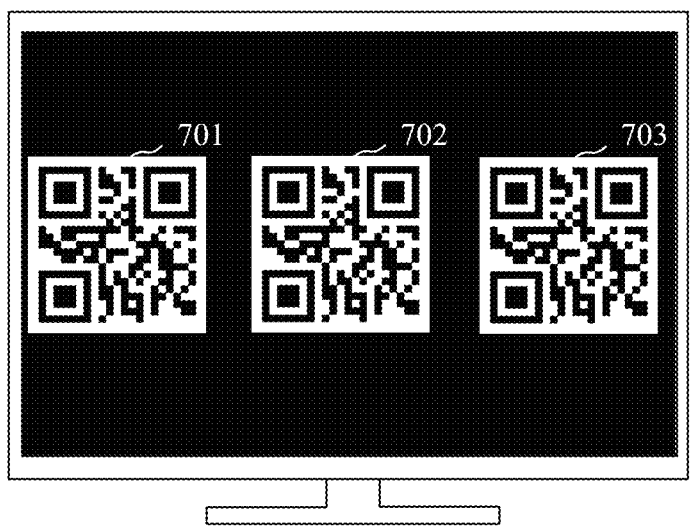

In this embodiment of this application, one or more QR codes may be displayed on the large screen. For example, in FIG. 7A to FIG. 7H, one QR code may be displayed on the large screen. As shown in FIG. 7I, two QR codes (a QR code 701 and a QR code 702) may be displayed on the large screen. As shown in FIG. 7J, three QR codes (a QR code 701, a QR code 702, and a QR code 703) may be displayed on the large screen. It can be learned from the illustrative descriptions in FIG. 7A to FIG. 7J that one QR code may be displayed on the screen of the smart TV, or two, three, or more QR codes may be displayed on the screen of the smart TV at the same time, and each source device may scan one QR code to join projection sharing. A quantity of QR codes displayed on the large screen is not limited in embodiments of this application.

As shown in FIG. 7I, a user 1 may use the mobile phone 1 to scan a QR code on the large screen to establish a communication connection to the smart TV, and a user 2 may use a mobile phone 2 to scan a QR code on the large screen to establish a communication connection to the smart TV. For example, video data of the mobile phone 1 may be projected onto a screen subarea 1 of the large screen, and video data of the mobile phone 2 may be projected onto a screen subarea 2 of the large screen. The mobile phone 1 and the mobile phone 2 can perform projection sharing through the smart TV.

It should be noted that, for the smart TV, if no source device is connected before, only one QR code may be displayed on the large screen of the smart TV, or two QR codes may be displayed on the large screen of the smart TV at the same time. After a source device is added by scanning a QR code, another QR code may be displayed on the large screen of the smart TV, or the second QR code originally displayed is zoomed out and displayed on the left, right, top, or bottom of the large screen, or a QR code may be displayed in a floating manner in a current interface, or a QR code may be displayed in the current interface in a picture-in-picture manner. For details, refer to the following content and illustrative descriptions.

Step 403: The mobile phone 1 sends a first projection instruction to the smart TV.

For example, the user uses the projection app in the mobile phone 1 to establish the WI-FI connection to the smart TV. As shown in FIG. 6, the interface 601 displayed by the mobile phone 1 may further include a projection option 604. If it is detected that the user taps the projection option 604 after selecting the identifier 603 of the smart TV, the mobile phone may serve as a source device and send the first projection instruction to a destination device (namely, the smart TV) selected by the user. For example, the projection instruction may include an identifier of the mobile phone 1, and after receiving the first projection instruction, the smart TV may determine that a source device that performs projection subsequently is the mobile phone 1. Alternatively, the mobile phone may automatically perform projection after scanning the QR code on the large screen and establishing the connection to the smart TV, instead of tapping the projection option 604 by the user. A specific projection manner is not limited herein.

Certainly, after selecting the identifier 603 of the smart TV, the user may alternatively manually set the smart TV as a source device or a destination device in the projection app. When the user sets the smart TV as a destination device, the mobile phone 1 is a source device of the smart TV. When the user sets the smart TV as a source device, the mobile phone 1 is a destination device of the smart TV. This is not limited in embodiments of this application.

Step 404: The smart TV configures a corresponding speaker device for a screen subarea based on the mapping relationship table between a screen subarea and a speaker device.

In this embodiment of this application, after receiving the first projection instruction of the mobile phone 1, in response to the first projection instruction, the smart TV determines a current source device, and configures a corresponding speaker device for a screen subarea occupied by the source device. For example, if only one screen area is displayed on the large screen, all the speaker devices connected to the smart TV are allocated to the screen area. As shown in FIG. 5A to FIG. 5D, all the audio modules or speaker devices are allocated to the screen area.

In this embodiment of this application, a location of the screen subarea of projection is bound to the speaker device. To be specific, a left projection location corresponds to the left speaker device, and a right projection location corresponds to the right speaker device. When the mobile phone 1 performs projection by scanning a QR code, if the mobile phone 1 scans a QR code on the left, the left speaker device is used for projection, or if the mobile phone 1 scans a QR code on the right, the right speaker device is used for projection.

It should be noted that, when a plurality of devices perform projection, the smart TV may determine, based on a location of a QR code scanned by a source device, one or more speaker devices that are to be allocated to the source device. For example, when the first source device performs projection, all the speaker devices are allocated to the first source device. When the second source device joins projection, if the second source device scans a QR code on the right of the screen, the smart TV may allocate the right subarea of the screen and the right speaker device to the second source device, and allocate the left subarea of the screen and the left speaker device to the first source device. For another example, if the second source device scans a QR code on the left of the screen, the smart TV may allocate the left subarea of the screen and the left speaker device to the second source device, and allocate the right subarea of the screen and the right speaker device to the first source device. Alternatively, when the second source device joins projection, the smart TV may allocate, by default, the left or right screen area and the corresponding speaker device to the second projection source device, and allocate the screen area and the speaker device on the other side to the first projection source device. Alternatively, after the first source device performs projection, two QR codes may be simultaneously displayed on the left and the right of the screen of the smart TV. That is, two QR codes are simultaneously displayed on the screen, where one is on the left and the other is on the right. If the second source device scans the QR code on the left, the left screen area and the left speaker device are allocated to the second source device, and the right screen area and the right speaker device are allocated to the first source device. If the second source device scans the right QR code, the right screen area and the right speaker device are allocated to the second source device, and the left screen area and the left speaker device are allocated to the first source device.

Step 405: The mobile phone 1 sends first display data and first audio data in the mobile phone 1 to the smart TV for projection.

The smart TV may receive the first display data and the first audio data that are sent by the mobile phone 1. For example, after determining a speaker device corresponding to a currently occupied screen subarea, the smart TV receives the first display data and the first audio data. It should be noted that the first display data displayed by the smart TV is a picture corresponding to the first display data. The first audio data played by the smart TV is audio corresponding to the first audio data.

Unlimitedly, there is no limitation on a logical sequence between receiving the display data and the audio data of the mobile phone by the smart TV and configuring the corresponding speaker device for the screen subarea by the smart TV. That is, step 404 may be performed before step 405, or step 405 may be performed before step 404, or step 404 and step 405 may be performed at the same time. This is not limited herein.

Unlimitedly, after the mobile phone 1 sends the first projection instruction, the mobile phone 1 may further negotiate a first projection parameter of current projection with the smart TV. A negotiation process is not described in detail herein. The mobile phone may generate, based on the first projection parameter, the display data and the audio data that need to be projected onto the smart TV.

Figure 8:
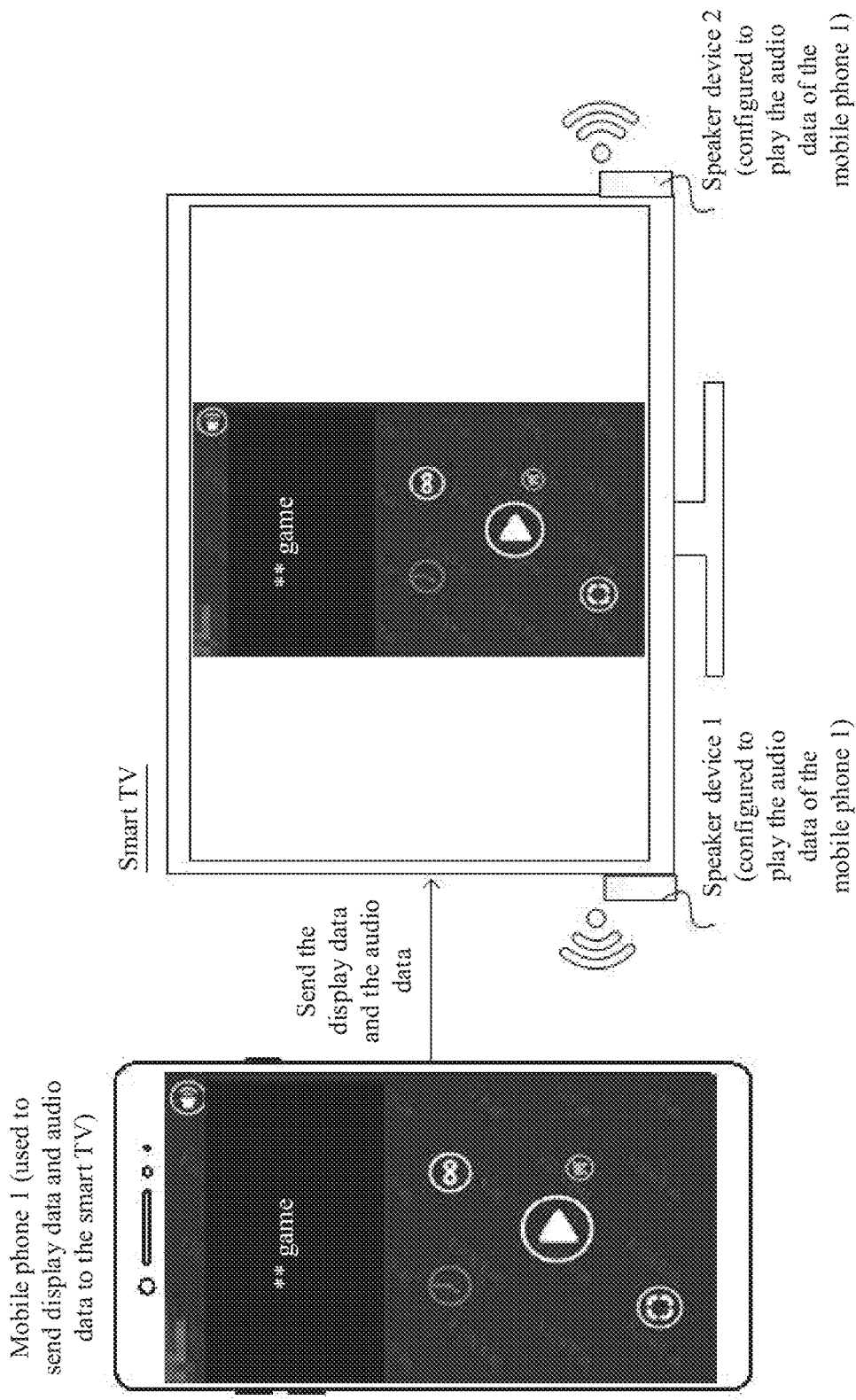
FIG. 8 is a schematic diagram 4 of an application scenario of a projected audio and video playing method according to an embodiment of this application.

For example, as shown in FIG. 8, after enabling a projection function in the mobile phone 1, the user opens a game app, and a first interface is displayed. In this case, the mobile phone 1 needs to project the first interface onto the smart TV for display, and send the first audio data to the smart TV. As shown in FIG. 8, when displaying the first interface, the smart TV may further play the first audio data by using an speaker device allocated to a screen subarea occupied by the mobile phone 1.

It should be noted that the first audio data sent by the mobile phone 1 to the smart TV may be original audio in the mobile phone 1, or may be audio data encoded by the mobile phone 1 based on the first projection parameter. This is not limited herein.

Step 406: The smart TV displays the first display data, and plays the first audio data by using the determined speaker device.

For example, the mobile phone 1 projects the first interface onto the smart TV. As shown in FIG. 8, after receiving the first display data sent by the mobile phone 1, the smart TV may decode and display the first display data based on the negotiated first projection parameter. For example, the smart TV may restore the first interface in a decoding manner corresponding to an encoding compression rate in the first projection parameter, and display the first interface based on projection resolution in the first projection parameter. When displaying the first display data, the smart TV further needs to play the first audio data by using the determined speaker device. The projectionist may experience projection sharing through the audio data played by the speaker device.

In the foregoing embodiment, an example in which the quantity of source devices (namely, the mobile phone 1) of the smart TV is 1 is used for description. It may be understood that the smart TV may dynamically receive display data and audio data sent by one or more source devices and perform projection and audio playing. When the quantity of source devices of the smart TV changes, and each source device performs projection onto each smart TV, the speaker device allocated by the smart TV to each screen subarea also changes dynamically. It should be noted that the first display data displayed by the smart TV is the picture corresponding to the first display data. The first audio data played by the smart TV is the audio corresponding to the first audio data.

Figure 9:
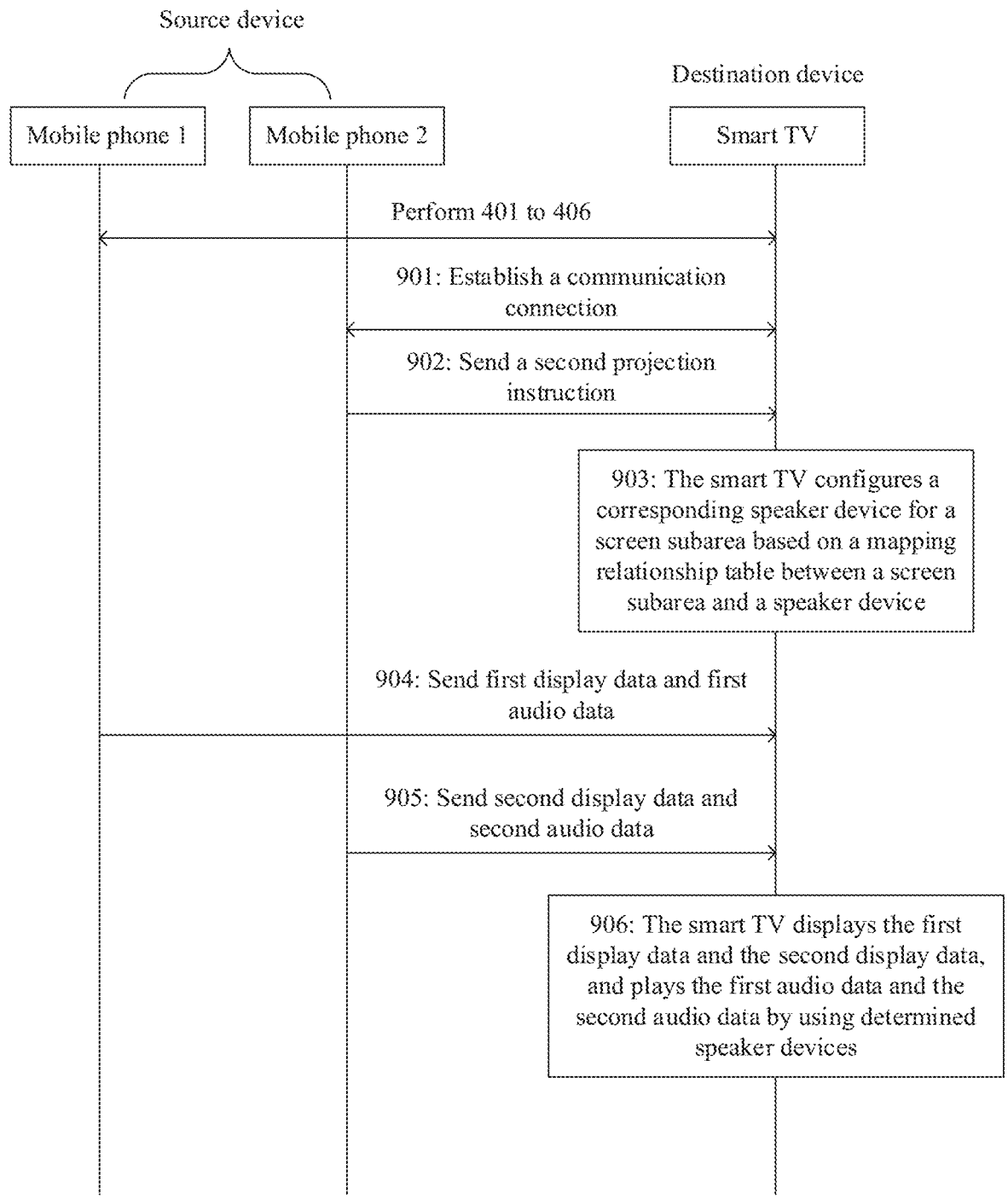
FIG. 9 is a schematic interaction diagram 2 of a projected audio and video playing method according to an embodiment of this application.

For example, in a process in which the mobile phone 1 sends the display data and the audio data to the smart TV, another source device may further establish a communication connection to the smart TV, and project display data and audio data to the smart TV. For example, a mobile phone 2 is a newly added source device of the smart TV. As shown in FIG. 9, the projected audio and video playing method provided in this embodiment of this disclosure further includes the following steps.

Step 901: The smart TV and the mobile phone 2 establish a communication connection.

A process in which the smart TV and the mobile phone 2 establish the communication connection is similar to a process in which the smart TV and the mobile phone 1 establish the communication connection in step 402. For example, the mobile phone 2 may scan a QR code shown in FIG. 10A, to obtain the identifier of the smart TV, and establish a WI-FI connection to the smart TV based on the identifier of the smart TV. Details are not described in this embodiment of this application.

Figure 10A:
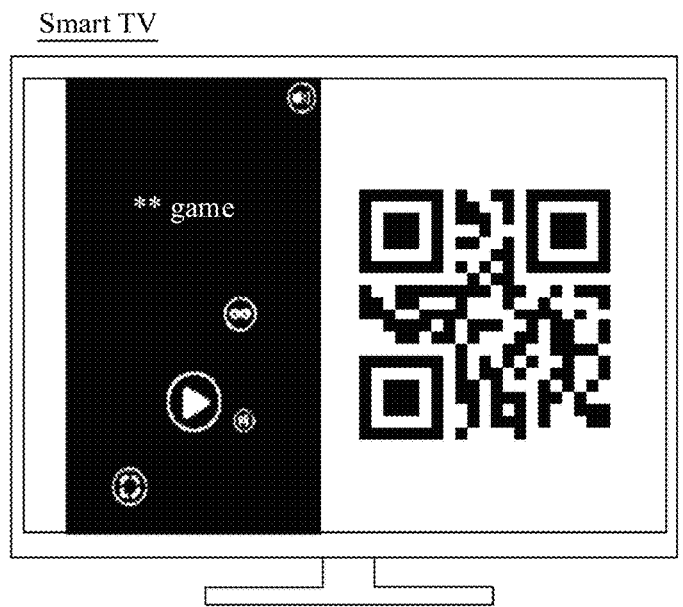
FIG. 10A to FIG. 10I are a schematic diagram 5 of an application scenario of a projected audio and video playing method according to an embodiment of this application.

For example, as shown in FIG. 8, the smart TV may display the first interface projected by the mobile phone 1 in the middle. For another example, as shown in FIG. 10A, the smart TV may alternatively display the first interface in a preset left screen subarea, and continue to display a QR code in a preset right screen subarea. Another source device may still establish a communication connection to the smart TV by scanning the QR code and start projection. In FIG. 10A, an example in which the QR code occupies all of the right screen subarea is used for description.

For another example, as shown in FIG. 8, when displaying the first interface projected by the mobile phone 1, the smart TV may alternatively hide the QR code. In addition, the smart TV may display an option used to call out the QR code. If it is detected that the user selects the option in the smart TV, as shown in FIG. 10A, the smart TV may redisplay the QR code while displaying the first interface, so that the other source device establishes the communication connection to the smart TV by scanning the QR code and starts projection.

As shown in FIG. 10A, the smart TV may alternatively display the first interface in the preset left screen subarea, and continue to display the QR code in the preset right screen subarea. The other source device may still establish the communication connection to the smart TV by scanning the QR code and start projection. In FIG. 10A, an example in which the QR code occupies all of the right screen subarea is used for description.

Figure 10B:
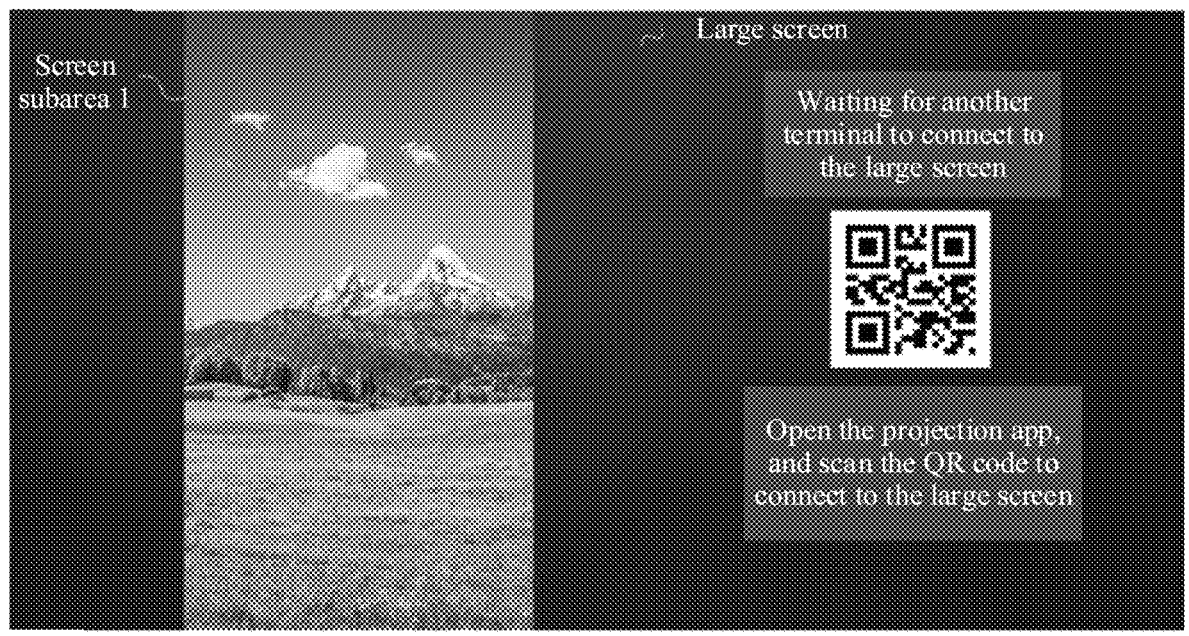

As shown in FIG. 10B, the smart TV may alternatively display the first interface in the preset left screen subarea. The first interface of the mobile phone 1 is displayed in portrait mode in a screen subarea, and the smart TV may continue to display the QR code in the preset right screen subarea. Another source device may still establish a communication connection to the smart TV by scanning the QR code and start projection. The QR code may occupy a part of a right area of the large screen. For example, the QR code is displayed in a zoomed-out image on the large screen. The QR code may be displayed in the right screen subarea of the large screen in a centered and zoomed-out manner. Alternatively, the interface of the mobile phone 1 may be displayed in landscape mode in a screen subarea.

Figure 10C:
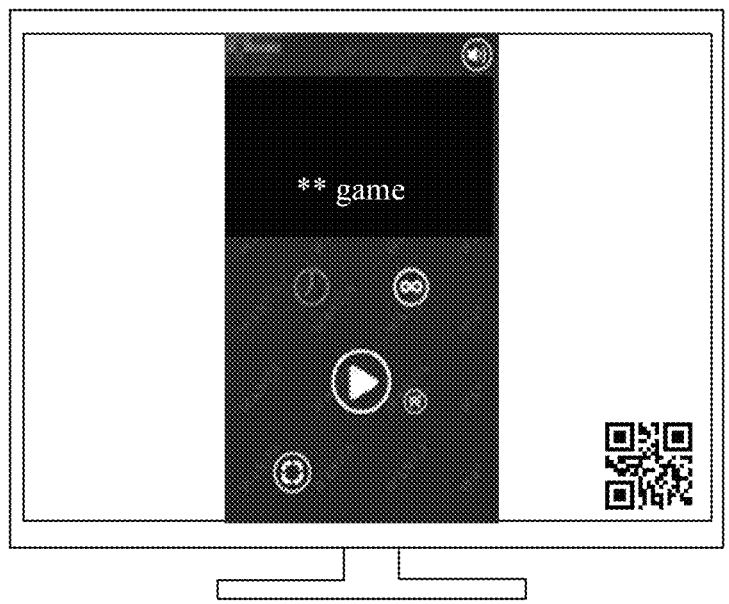
Figure 10D:
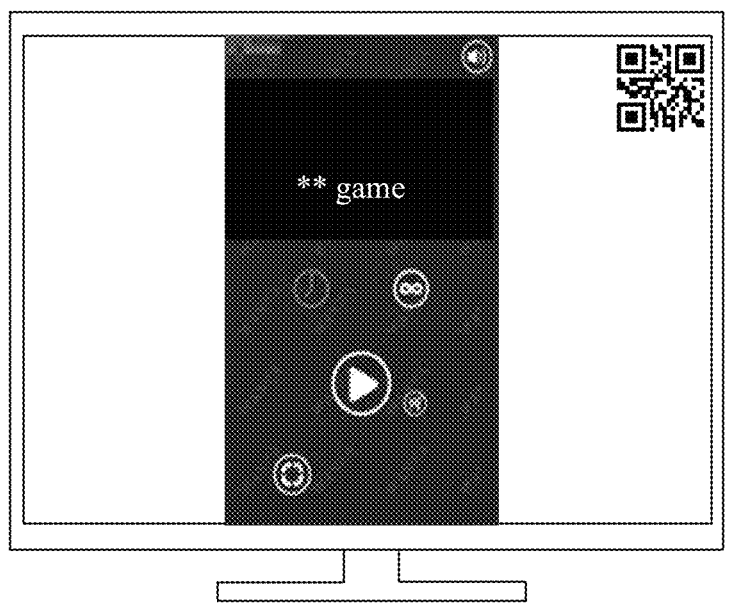
Figure 10E:
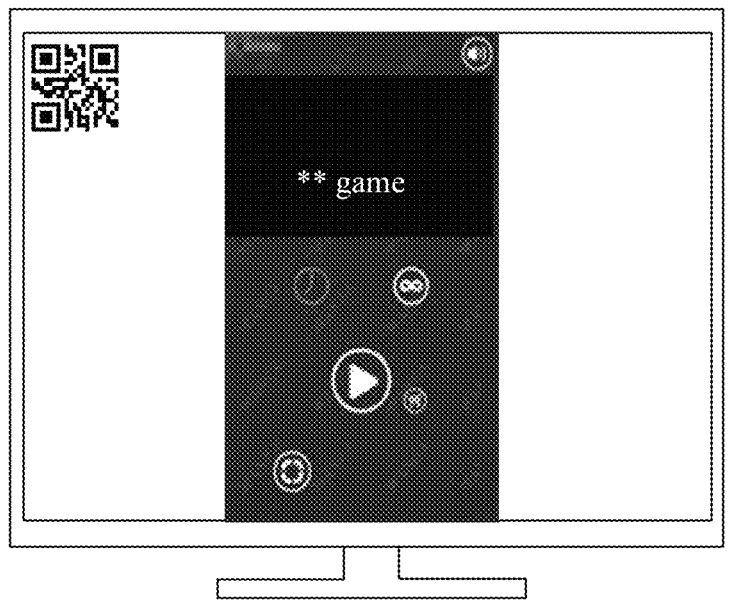
Figure 10F:
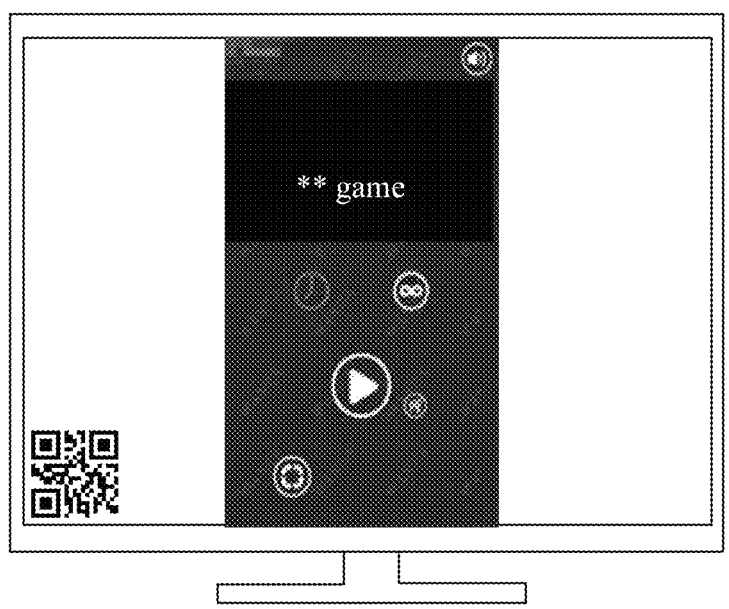
Figure 10G:
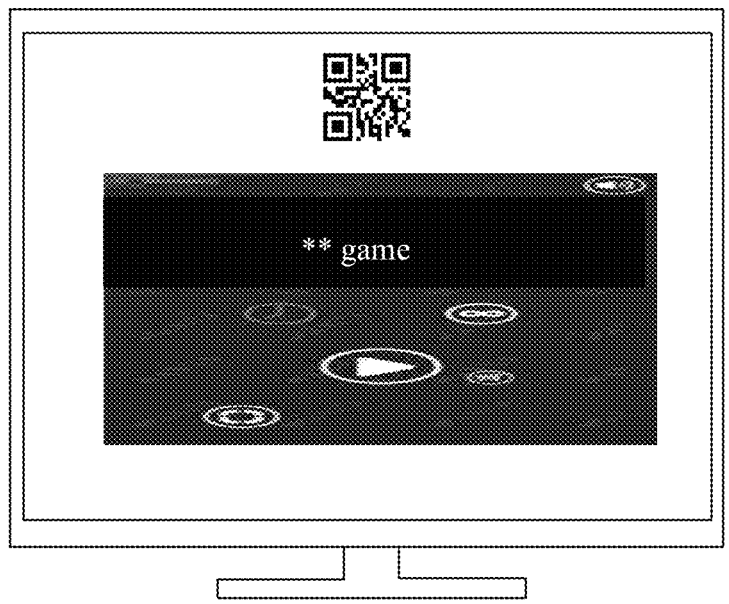
Figure 10H:
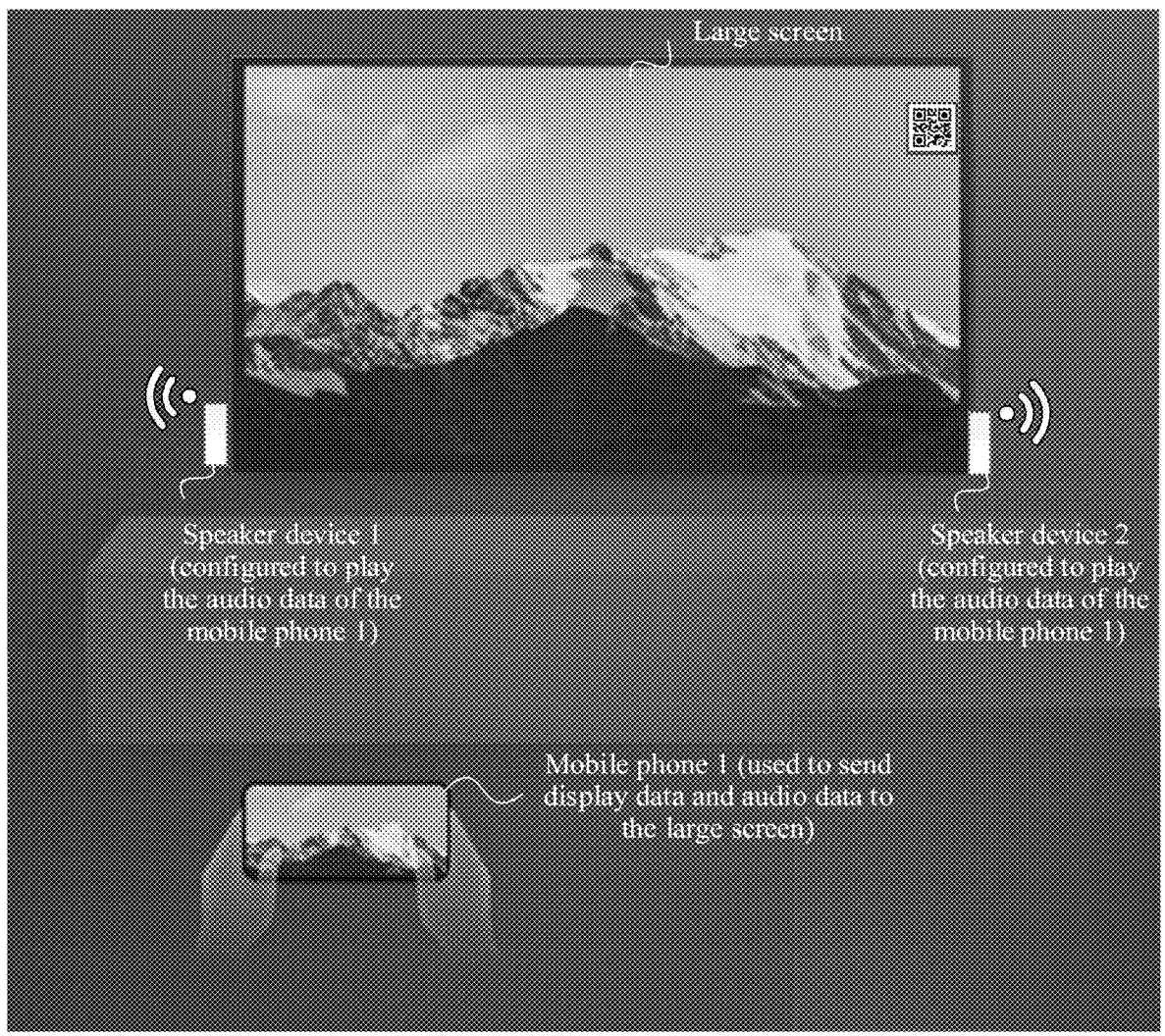

Alternatively, in another implementation, the first interface may be displayed in a middle area of the screen, and the QR code is displayed on the left or right of the screen. As shown in FIG. 10C, the first interface is displayed in the middle area of the screen, and the QR code is displayed in a lower right corner of the screen. As shown in FIG. 10D, the first interface is displayed in the middle area of the screen, and the QR code is displayed in an upper right corner of the screen. As shown in FIG. 10E, the first interface is displayed in the middle area of the screen, and the QR code is displayed in an upper left corner of the screen. As shown in FIG. 10F, the first interface is displayed in the middle area of the screen, and the QR code is displayed in a lower left corner of the screen. As shown in FIG. 10G, the first interface is displayed in the middle area of the screen, and the QR code is displayed in the upper middle of the screen (or may be displayed in the lower middle of the screen). As shown in FIG. 10H, the first interface is displayed on the screen in full screen mode, the QR code is displayed in a floating manner in an upper right corner of the first interface, and two speaker devices play the audio data of the mobile phone 1. It may be understood that, similar to that in FIG. 10H, the QR code may alternatively be displayed in a floating manner or in a picture-in-picture manner at another location, for example, in a lower left corner, a lower right corner, or an upper left corner of the screen.

Figure 10I:
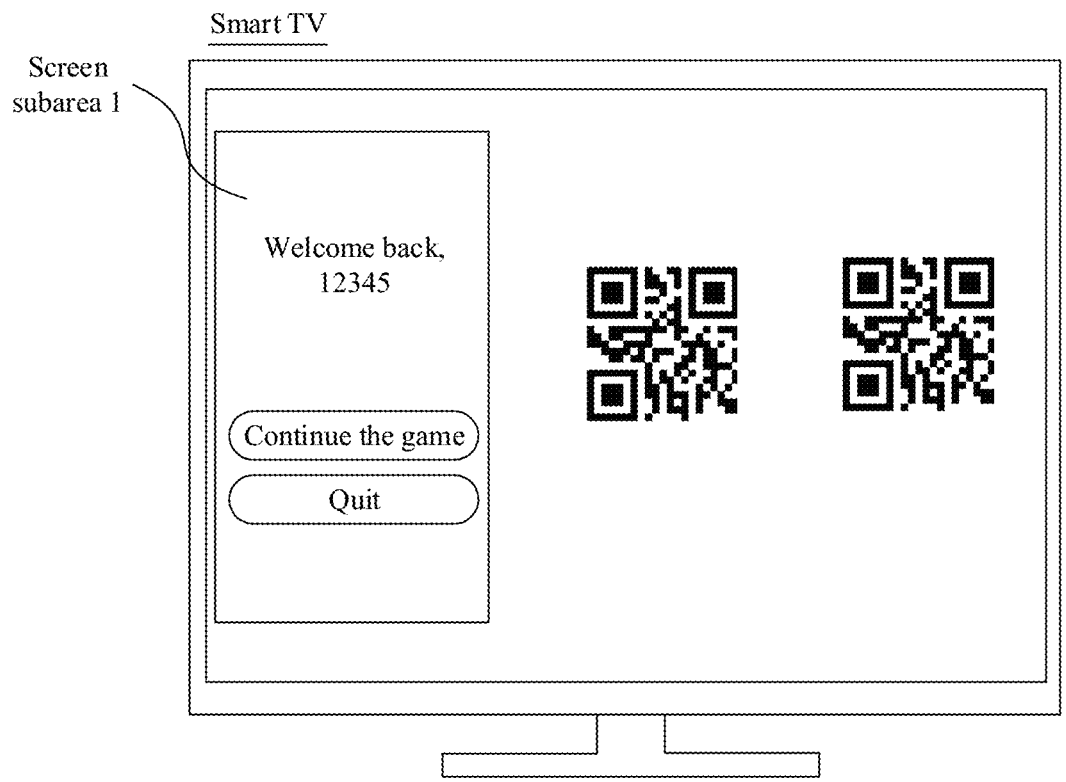

As shown in FIG. 10I, in this embodiment of this application, one or more QR codes may be displayed on the large screen. For example, in FIG. 10A to FIG. 10H, one QR code may be displayed on the large screen, and in FIG. 10I, two QR codes may be displayed on the large screen. It can be learned from the illustrative descriptions in FIG. 10A to FIG. 10I that one QR code may be displayed on the screen of the smart TV, or two, three, or more QR codes may be displayed on the screen of the smart TV at the same time, and each source device may scan one QR code to join projection sharing. A quantity of QR codes displayed on the large screen is not limited in embodiments of this application.

After the smart TV and the mobile phone 2 establish the communication connection, if the smart TV still maintains the communication connection to the mobile phone 1, the smart TV, the mobile phone 1, and the mobile phone 2 form a device group. Similarly, members in the device group may be dynamically increased or decreased.

Step 902: The mobile phone 2 sends a second projection instruction to the smart TV.

A process in which the mobile phone 2 sends the second projection instruction to the smart TV is similar to a process in which the mobile phone 1 sends the first projection instruction to the smart TV in step 403. Therefore, details are not described herein again.

Step 903: The smart TV configures a corresponding speaker device for a screen subarea based on the mapping relationship table between a screen subarea and a speaker device.

In this embodiment of this application, after receiving the second projection instruction of the mobile phone 2, in response to the second projection instruction, the smart TV determines a current source device, and configures a corresponding speaker device for a screen subarea occupied by the source device. For example, when a picture of only one source device (the mobile phone 1) is displayed before, all the speaker devices connected to the smart TV are allocated to the screen subarea occupied by the mobile phone 1. In this case, a correspondence between a speaker device and the screen subarea that is occupied by the mobile phone 1 may be changed. Some of the speaker devices originally allocated to the screen subarea of the mobile phone 1 are allocated to the screen subarea occupied by the mobile phone 2. For another example, a location of the screen subarea of projection is bound to the speaker device. To be specific, a left projection location corresponds to the left speaker device, and a right projection location corresponds to the right speaker device. When the mobile phone 2 performs projection by scanning a QR code, if the mobile phone 2 scans a QR code on the left, the left speaker device is used for projection, or if the mobile phone 2 scans a QR code on the right, the right speaker device is used for projection.

Figure 11A:
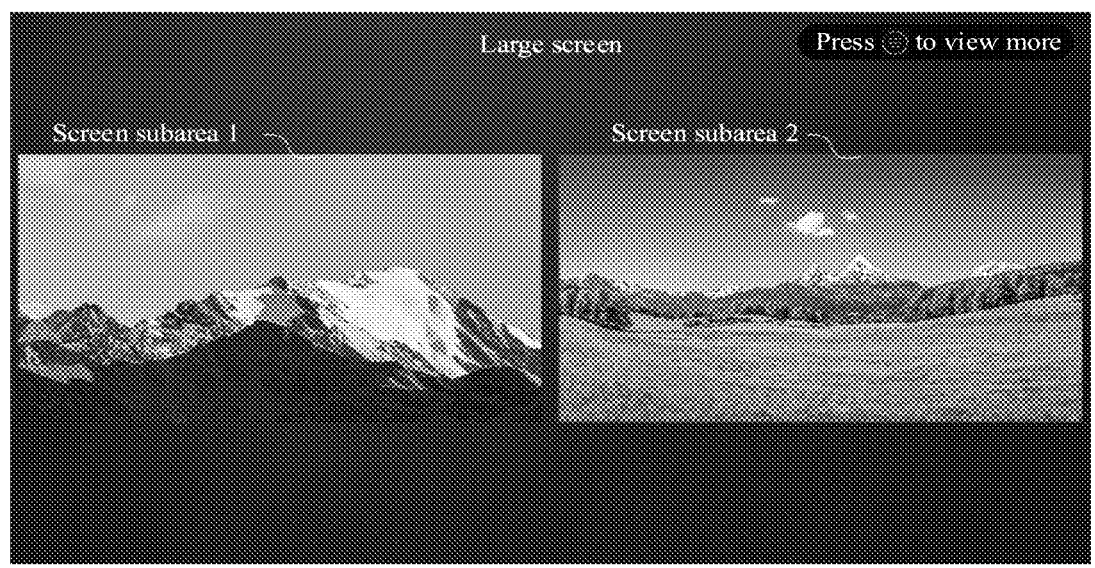
FIG. 11A to FIG. 11D are a schematic diagram 6 of an application scenario of a projected audio and video playing method according to an embodiment of this application.

It should be noted that when the two mobile phones perform projection at the same time, landscape interfaces of the two mobile phones may be simultaneously displayed on the large screen (as shown in FIG. 11A), or portrait interfaces of the two mobile phones may be simultaneously displayed on the large screen, or a landscape interface of one mobile phone and a portrait interface of the other mobile phone may be displayed on the large screen. In this embodiment of this application, display manners of different projected interfaces are not limited.

Figure 11B:
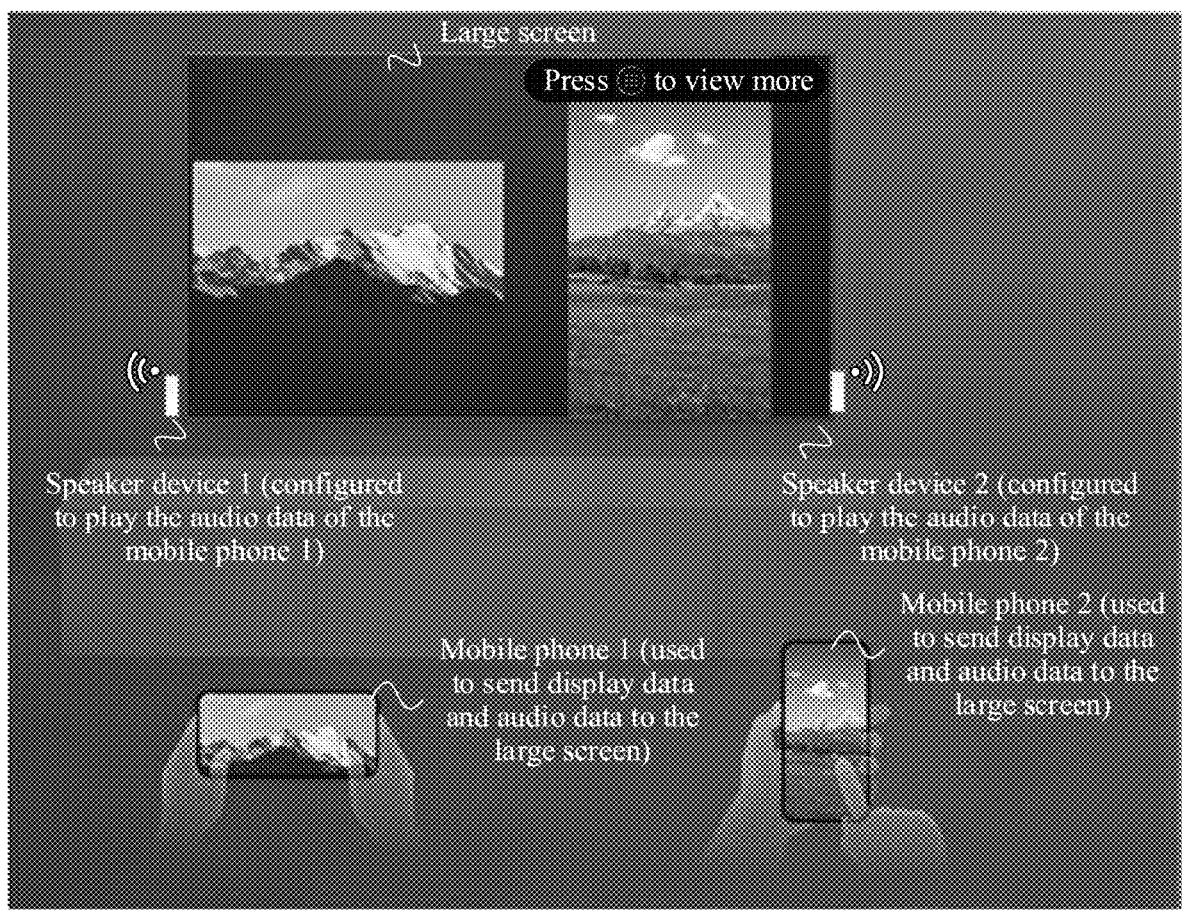

As shown in FIG. 11B, a speaker device 1 plays the audio data of the mobile phone 1, and a speaker device 2 plays audio data of the mobile phone 2.

Figure 11C:
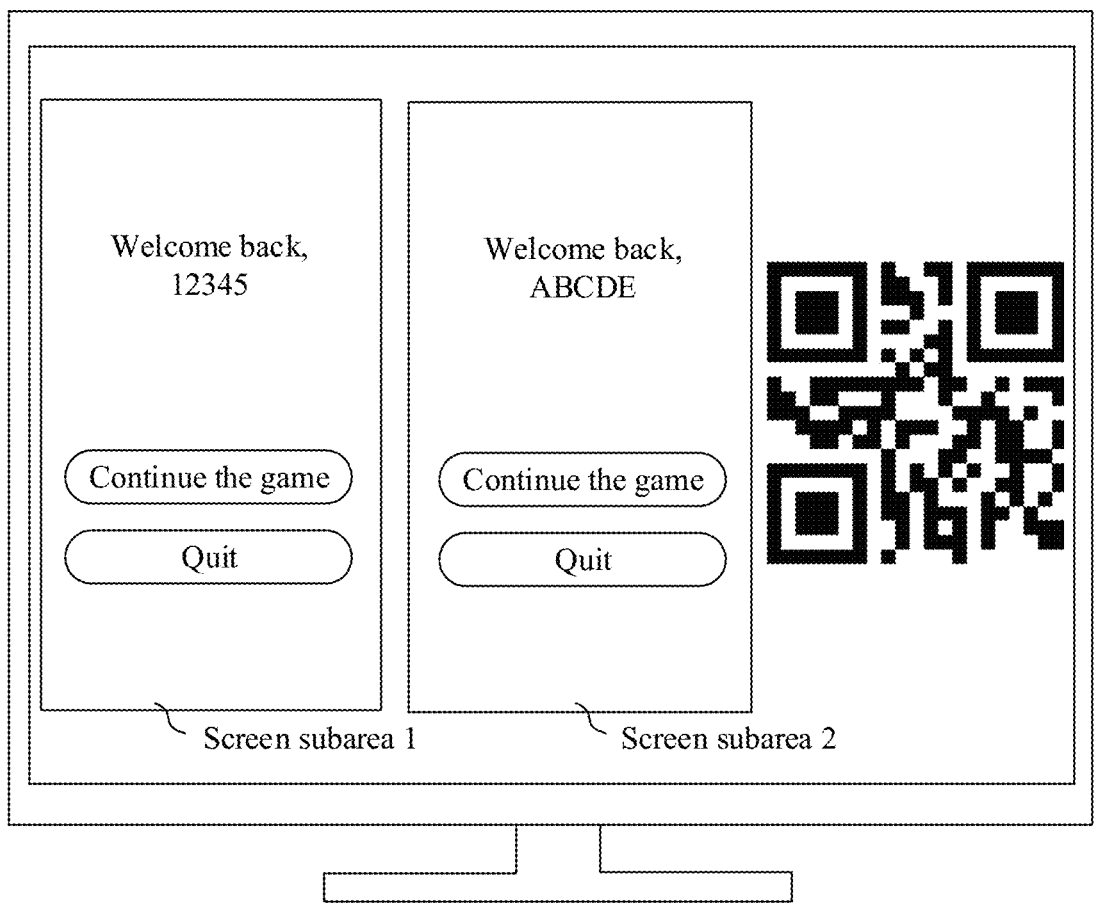

As shown in FIG. 11C, a portrait interface of the mobile phone 1 is projected onto a screen subarea 1, and a portrait interface of the mobile phone 2 is projected onto a screen subarea 2. The portrait interface of the mobile phone 1 and the portrait interface of the mobile phone 2 may be simultaneously displayed on the large screen, and a QR code may also be displayed on the large screen. A mobile phone 3 may also scan the QR code, and join projection sharing.

Figure 11D:
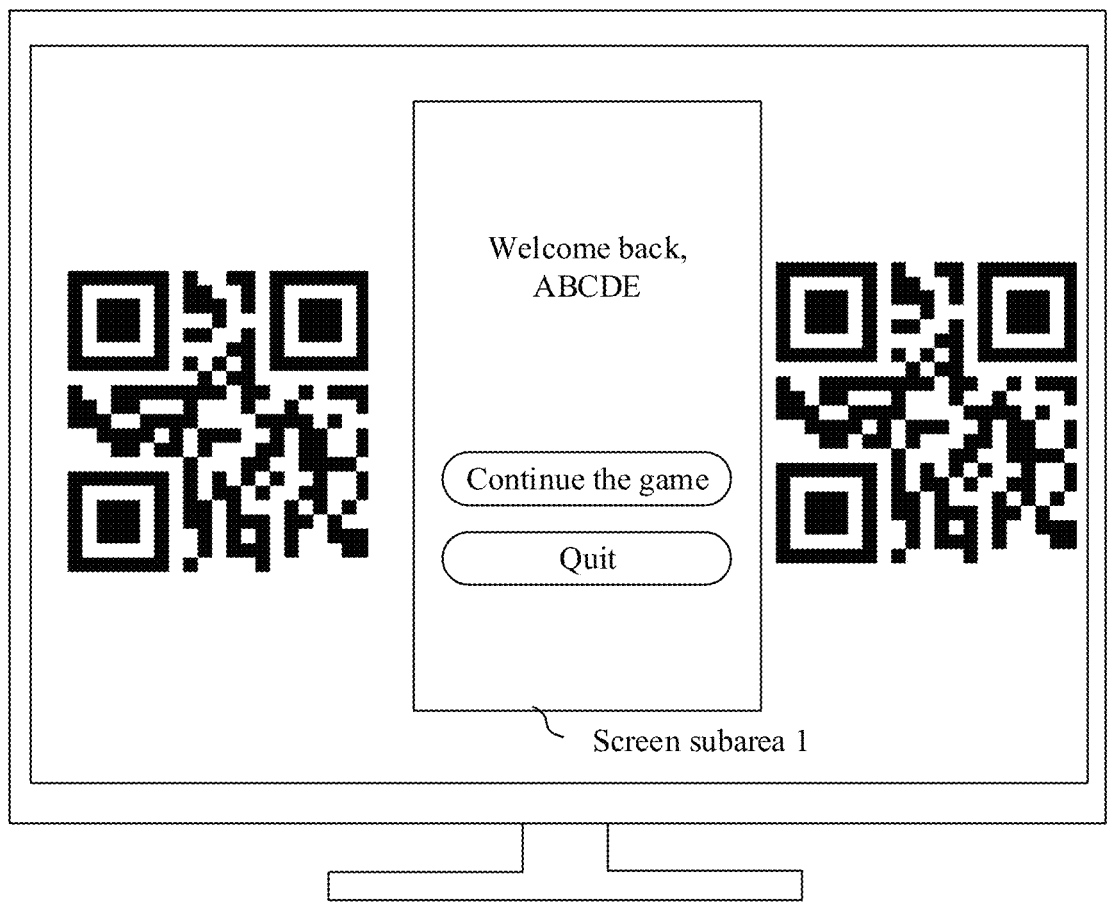

As shown in FIG. 11D, a picture of one source device (for example, the mobile phone 1) may be displayed on the large screen, and a QR code is displayed on each of the left side and right side. The mobile phone 2 may scan the QR code on the left, or may scan the QR code on the right. If the mobile phone 2 scans the QR code on the left, the mobile phone 2 may perform projection onto the left screen subarea, or if the mobile phone 2 scans the QR code on the right, the mobile phone 2 may perform projection onto the right screen subarea. It may be understood that the interface of the mobile phone 1 may be displayed in full screen or in the middle on the large screen. After a new source device is added for projection onto the large screen, projection of the mobile phone 1 needs to be moved from the left screen subarea to the right screen subarea. At the same time, the speaker device corresponding to the screen subarea corresponding to mobile phone 1 is switched, to ensure a real-time correspondence between the speaker device and the screen subarea corresponding to the mobile phone 1.

This embodiment of this disclosure may be applied to scenarios such as dual-channel or multi-channel audio and video sharing, and display of a text stream with audio, and is used in an electronic device such as a smart TV. Projection of game confrontation is used as an example. When two or more players simultaneously participate in a same game for confrontation, video and sound effects on their electronic devices are shared to a large-screen destination device, and fair competition is performed on a large screen. The screen is divided into two or more screen subareas, a game sound effect of the left player is played in a left speaker of the large screen, and a game sound effect of the right player is played in a right speaker of the large screen. When audio and video of respective perspectives are shared, the players can focus on audio-visual experience on respective sides.

Step 904: The mobile phone 1 sends first display data and first audio data in the mobile phone 1 to the smart TV for projection.

Step 905: The mobile phone 2 sends second display data and second audio data in the mobile phone 2 to the smart TV for projection.

After the smart TV determines a speaker device corresponding to a currently occupied screen subarea, the smart TV may display the received second display data sent by the mobile phone 2 and play the received second audio data sent by the mobile phone 2. Unlimitedly, after the mobile phone 2 sends the second projection instruction, the mobile phone 2 may further negotiate a second projection parameter of current projection with the smart TV. A negotiation process is not described in detail herein. The mobile phone may generate, based on the second projection parameter, the display data and the audio data that need to be projected onto the smart TV.

For example, as shown in FIG. 8, a second interface of the mobile phone 2 is similar to the first interface of the mobile phone 1. The second interface of the mobile phone 2 is not described herein. After enabling a screen projection function in the mobile phone 2, the user opens a game app, and the second interface is displayed. In this case, the mobile phone 2 needs to project the second interface onto the smart TV for display, send the second audio data to the smart TV, and play the second audio data by using a speaker device that is allocated by the smart TV based on the screen subarea occupied by the mobile phone 2.

It should be noted that the second audio data sent by the mobile phone 2 to the smart TV may be original audio in the mobile phone 2, or may be audio data encoded by the mobile phone 2 based on the second projection parameter. This is not limited herein.

Step 906: The smart TV displays the first display data and the second display data, and plays the first audio data and the second audio data by using the determined speaker devices.

The smart TV may play the audio data of the mobile phone 1 and the audio data of the mobile phone 2 by using different speaker devices. When the mobile phone 1 and the mobile phone 2 share audio and videos with the smart TV, the audio data can be dynamically and adaptively output based on video adding locations. In a many-to-one audio and video sharing scenario, for example, in a two-to-one projection scenario, the large screen of the smart TV is divided into left and right subareas, and a projectionist is located on a corresponding side. If the smart TV is configured with two speaker devices, to enable the projectionist to focus on audio-visual experience on the user's side in multi-sensory multi-dimensional dimensions, corresponding audio data needs to be played on the side, and this reduces impact of audio data in projection on the other side on the user.

In this embodiment of this application, the mobile phone 1 is a terminal operated by a projectionist 1, the mobile phone 2 is a terminal operated by a projectionist 2, and the two projectionists stand on the left and right of the same large screen respectively, and perform projection. The big screen is divided into left and right screen subareas, and the smart TV includes a left speaker and a right speaker. In this case, there is a correspondence between the screen subarea and the speaker device. The user standing on the left of the large screen can scan a QR code on the left of the large screen by using the mobile phone 1, and the left speaker of the large screen is mapped and mounted on the left screen subarea. The user standing on the right of the large screen can scan a QR code on the right of the large screen by using the mobile phone 2, and the right speaker is mounted on the right screen subarea. Therefore, the user can focus on sensory experience of projected content on the user's side, and can use the large screen to improve projection sharing experience. When or before the mobile phone is connected to the large screen for projection, prompt information may be displayed in an interface of the large screen, to prompt the user of the screen projection solutions described in the foregoing embodiments. For example, when a plurality of users (for example, two users) perform projection, a left part of the screen and a left speaker device are allocated to a source device that scans a QR code on the left, and a right part of the screen and a right speaker device are allocated to a source device that scans a QR code on the right.

In some embodiments of this application, both the mobile phone 1 and the mobile phone 2 are performing projection sharing, and the smart TV may further receive a screen switching instruction sent by the user, so that the smart TV may change the speaker device corresponding to the screen subarea originally occupied by each of the mobile phone 1 and the mobile phone 2. After a location of the mobile phone changes, a direction of a sound source played by the speaker device also changes. In this way, the user can focus on sensory experience of projection on the user's side, and can use the large screen to improve projection sharing experience.

In the foregoing embodiment, an example in which the smart TV has two source devices (that is, the mobile phone 1 and the mobile phone 2) is used for description. It may be understood that the smart TV may dynamically receive display data and audio data that are sent by one or more source devices, and perform projected audio playing. When a quantity of source devices of the smart TV changes, when each source device performs projection onto the smart TV, the speaker device allocated by the smart TV to each screen subarea also changes dynamically. In addition, a source device that has joined projection sharing may also quit projection sharing halfway. In this case, the smart TV may dynamically receive projection quit instructions sent by one or more source devices. When the quantity of source devices of the smart TV changes, when each source device performs projection onto the smart TV, the speaker device allocated by the smart TV to each screen subarea also changes dynamically.

Figure 12:
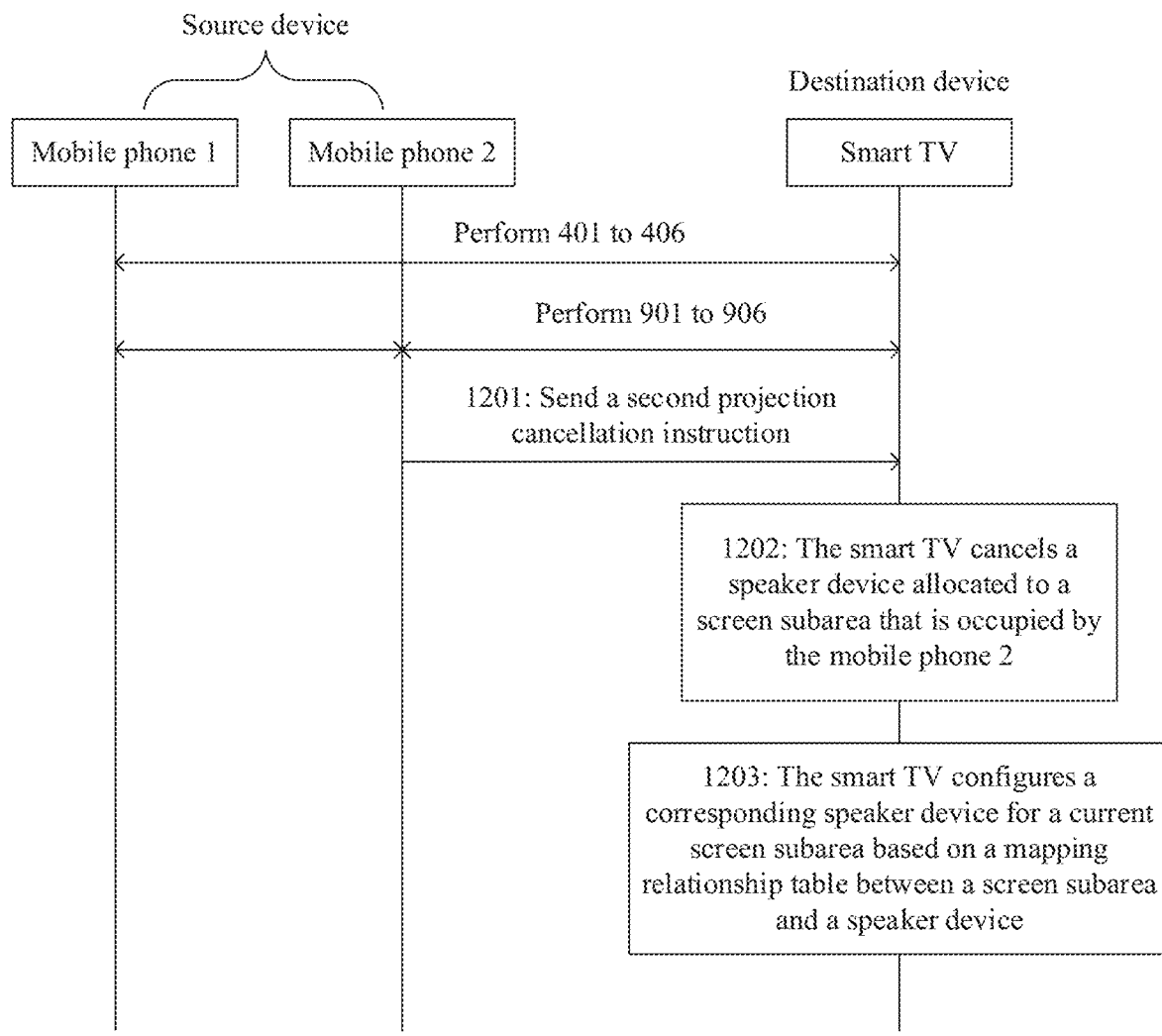
FIG. 12 is a schematic interaction diagram 3 of a projected audio and video playing method according to an embodiment of this application.

For example, in a process in which the mobile phone 1 and the mobile phone 2 project audio play data and audio data onto the smart TV, a mobile phone that has joined projection sharing may quit projection. For example, the mobile phone 2 initiates a projection quit instruction. As shown in FIG. 12, a projected audio and video playing method provided in this embodiment of this disclosure further includes the following steps.

Step 1201: The mobile phone 2 sends a second projection quit instruction to the smart TV.

The mobile phone 2 sends the second projection quit instruction to the smart TV, to instruct, to the smart TV, that the mobile phone 2 needs to quit projection.

The mobile phone 2 may dynamically join projection sharing, or may dynamically quit projection sharing. Similarly, the mobile phone 1 may dynamically join projection sharing, or may dynamically quit projection sharing. This is not limited herein. If the mobile phone 1 needs to quit projection, the mobile phone 1 may also send a first projection quit instruction to the smart TV.

Step 1202: The smart TV cancels the speaker device allocated to the screen subarea that is occupied by the mobile phone 2.

After the smart TV receives the second projection quit instruction sent by the mobile phone 2, the smart TV no longer plays the audio data of the mobile phone 2. Therefore, the speaker device previously allocated by the smart TV to the screen subarea that is occupied by the mobile phone 2 does not need to be retained. The smart TV may cancel the speaker device allocated to the screen subarea that is occupied by the mobile phone 2.

The user may quit multi-terminal projection sharing. That is, the user may cancel projection sharing. In this case, the large screen of the smart TV may switch from displaying two screen subareas back to displaying a single screen area.

Step 1203: The smart TV configures a corresponding speaker device for a current screen subarea based on the mapping relationship table between a screen subarea and a speaker device.

Figure 13:
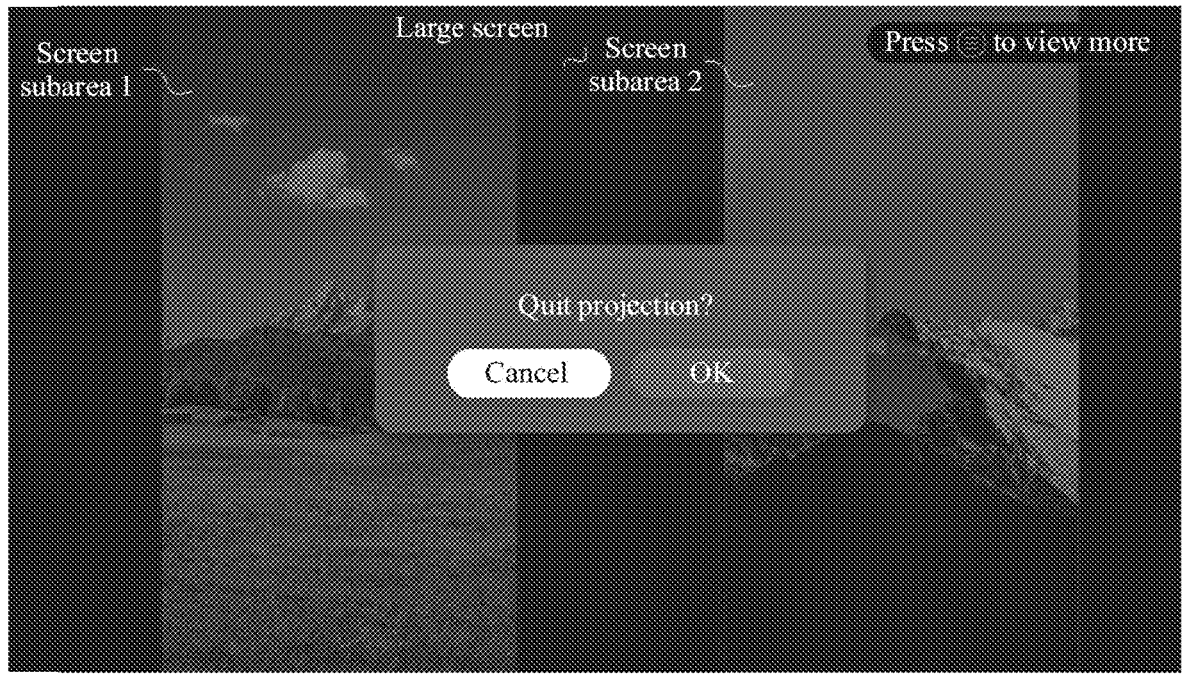
FIG. 13 is a schematic diagram 7 of an application scenario of a projected audio and video playing method according to an embodiment of this application.

In this embodiment of this application, as shown in FIG. 13, after receiving the second projection quit instruction of the mobile phone 2, in response to the second projection quit instruction, the smart TV determines a current source device, and configures the corresponding speaker device for the screen subarea occupied by the source device. For example, when the mobile phone 1 and the mobile phone 2 are performing projection sharing, the user of the mobile phone 2 may send a projection quit instruction. In this case, the smart TV may withdraw, based on the mapping relationship table between the screen subarea and the speaker device, the speaker device allocated to the mobile phone 2, and reallocate the speaker device to the mobile phone 1, to implement appropriate utilization of all the speaker devices. If the mobile phone 2 applies to quit projection, the smart TV may no longer allocate the corresponding speaker device to the screen subarea occupied by the mobile phone 2.

Before projection, the user divides the screen into screen subareas for different quantities of projection screens based on a screen size, collects statistics on connected speakers in the environment, and establishes a mapping table for different quantities of projection screens. The mapping table is used as a subsequent audio adaptation adjustment policy. During projection, when a projectionist quits, an allocated speaker is withdrawn according to a preset policy, so that an audio output direction can be dynamically adjusted.

In the foregoing embodiment, an example in which the smart TV has two source devices (that is, the mobile phone 1 and the mobile phone 2) is used for description. It may be understood that the smart TV may dynamically receive display data and audio data that are sent by one or more source devices, and perform projected audio playing. When the quantity of source devices of the smart TV changes, when each source device performs projection onto the smart TV, the speaker device allocated by the smart TV to each screen subarea also changes dynamically. In addition, a source device that has joined projection sharing may also quit projection sharing halfway. In this case, the smart TV may dynamically receive projection quit instructions sent by one or more source devices. When the quantity of source devices of the smart TV changes, when each source device performs projection onto the smart TV, the speaker device allocated by the smart TV to each screen subarea also changes dynamically.

Figure 14:
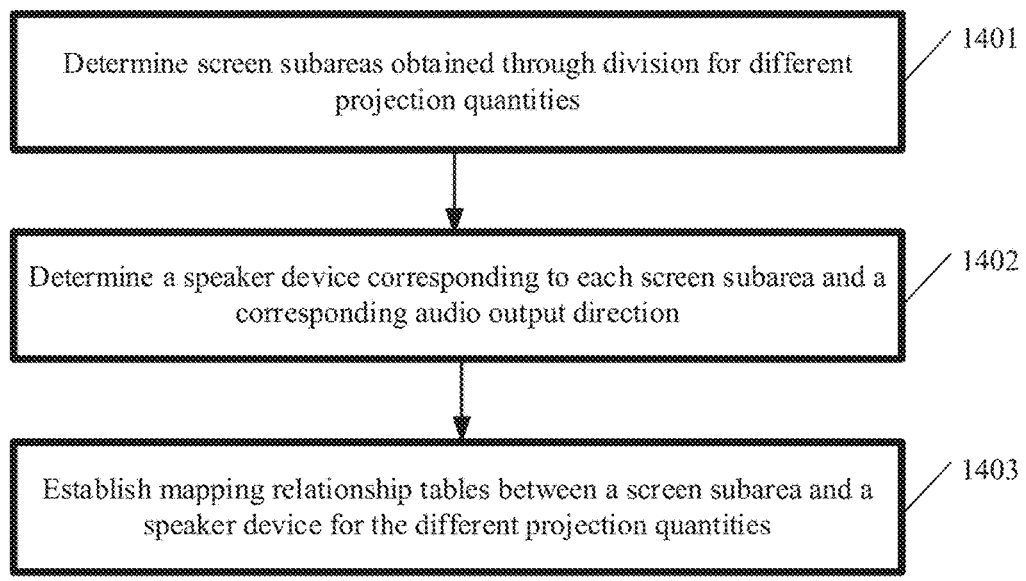
FIG. 14 is a schematic diagram 8 of an application scenario of a projected audio and video playing method according to an embodiment of this application.

As shown in FIG. 14, the following describes a process of establishing a mapping relationship table between a screen subarea and a speaker device, which mainly includes the following steps:

1401: Determine screen subareas obtained through division for different projection quantities.

1402: Determine a speaker device corresponding to each screen subarea and a corresponding audio output direction.

1403: Establish mapping relationship tables between a screen subarea and an speaker device for the different projection quantities.

The speaker device may also be expressed as an audio output device. When there is only one projectionist, a left speaker device and a right speaker device of a large screen are mapped and mounted to a same video display. When there are two projectionists on the left and right, the left speaker device of the large screen is mapped and mounted to a left screen subarea, and the right speaker device is mounted to a right screen subarea.

For example, when only the mobile phone 1 is performing projection sharing, audio data of the mobile phone 1 is played through all the speaker devices of the smart TV. The mobile phone 2 may join projection sharing of the smart TV through a QR code displayed on the screen. For example, the mobile phone 2 scans the QR code, and sends a projection instruction to the smart TV. The smart TV may change, based on the mapping relationship table between a screen subarea and a speaker device, the speaker devices originally corresponding to the mobile phone 1, that is, allocate some of the speaker devices that are originally allocated to the mobile phone 1 to the mobile phone 2. Therefore, the original mapping relationship between a screen subarea and a speaker device is changed, so that the mobile phone 2 can join projection sharing, and a speaker device at a corresponding location can be allocated to the mobile phone 2. In this way, the user of the mobile phone 1 hears the audio data on a corresponding side, and the user of the mobile phone 2 can also hear audio data on a corresponding side.

Before projection, the user divides the screen into screen subareas for different projection quantities based on a screen size, collects statistics on connected speaker devices in the environment, and establishes mapping tables for the different projection quantities. The mapping tables are used as a subsequent audio adaptation adjustment policy. During projection, when a new projectionist joins projection, a speaker device is allocated according to a preset policy, so that an audio output direction can be dynamically adjusted. For example, when there is only one projectionist, all the speaker devices may be mapped to the screen, or only some of the speaker devices may be mapped to the screen.

Figure 15A:
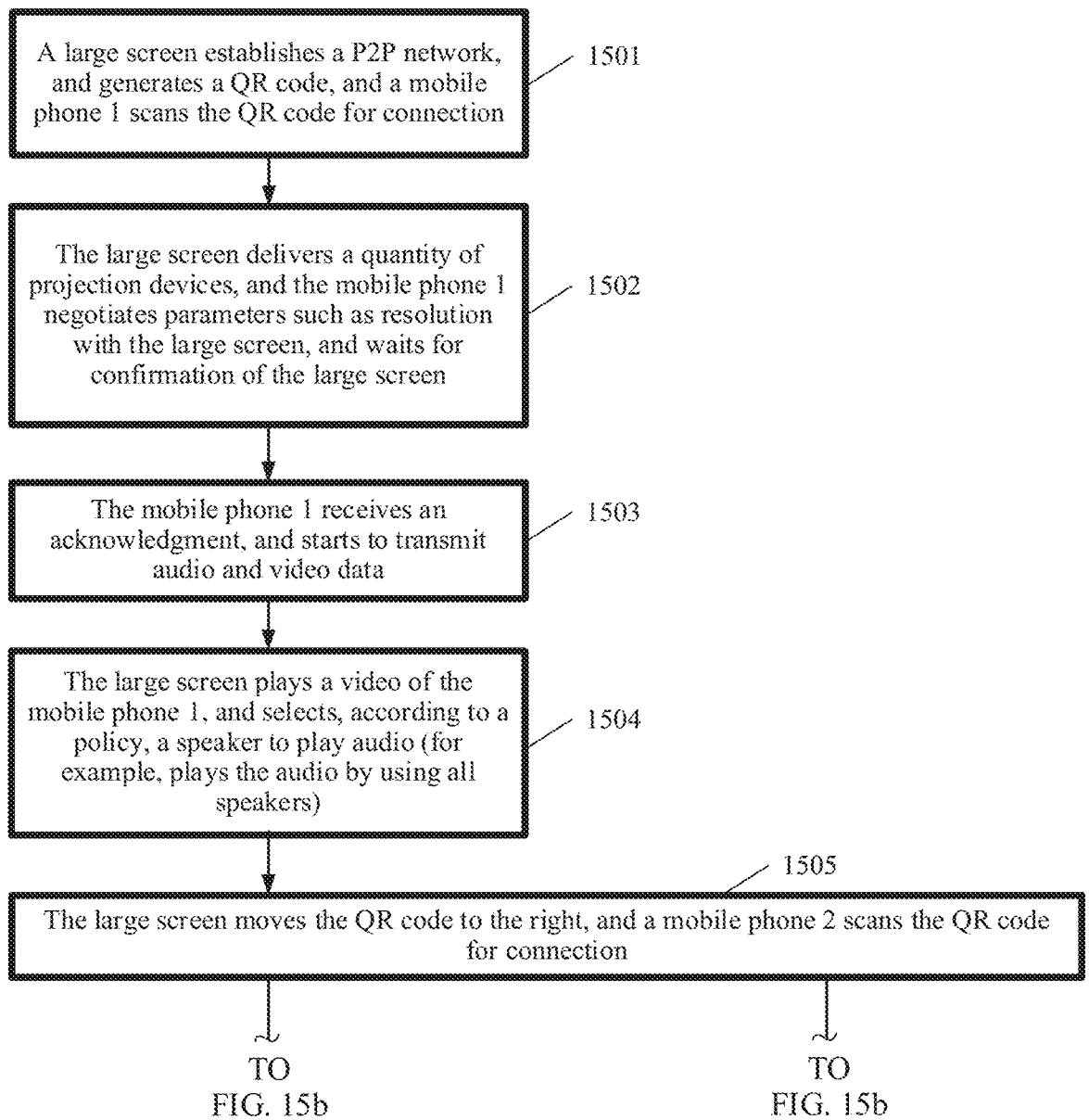
FIG. 15A and FIG. 15B are a schematic diagram 9 of an application scenario of a projected audio and video playing method according to an embodiment of this application.
Figure 15B:
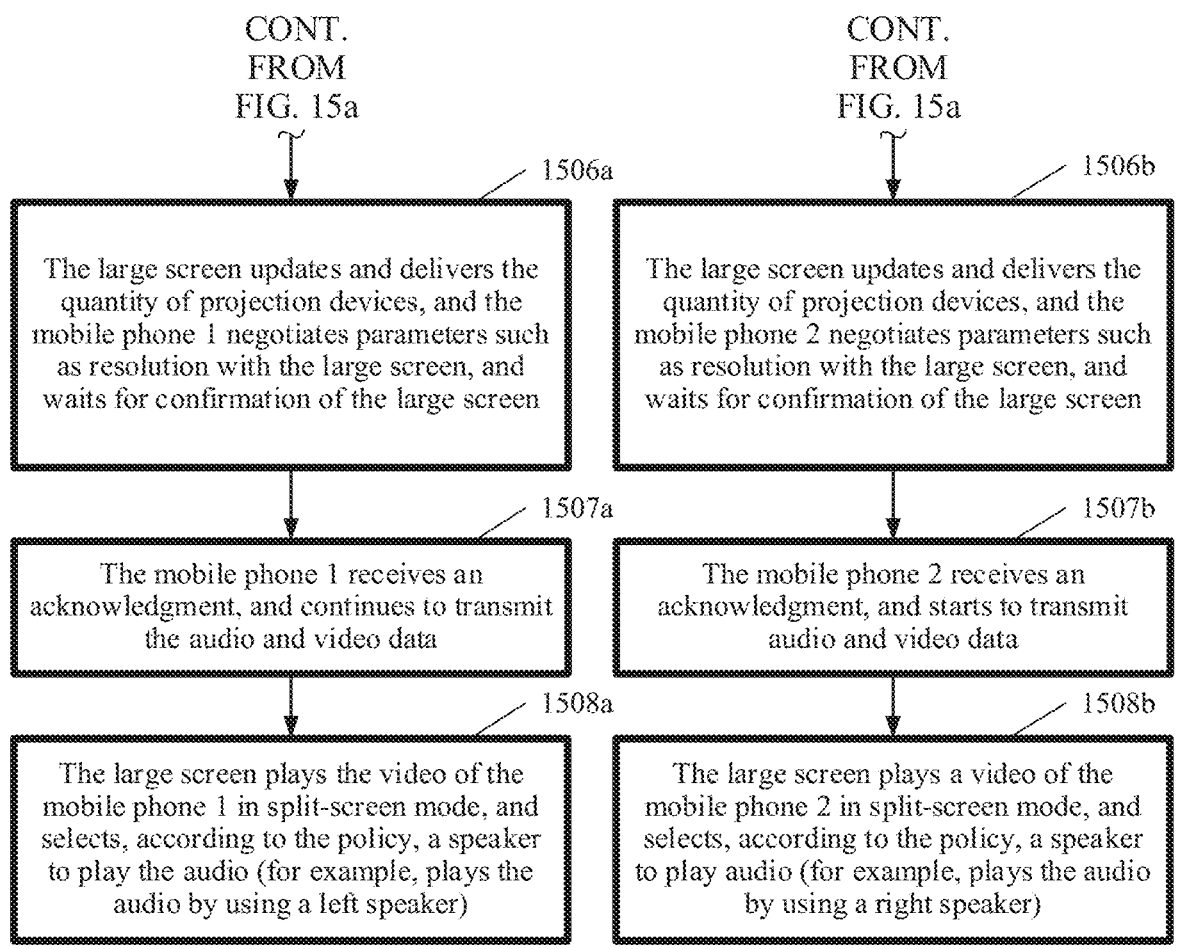

As shown in FIG. 15A and FIG. 15B, a process of projection negotiation between a mobile phone and a smart TV is described below by using an example.

1501: A large screen establishes a P2P network, and generates a QR code, and a mobile phone 1 scans the QR code for connection.

The large screen functions as a group owner (GO) and the mobile phone functions as a group client (GC), to establish the P2P network and generate a network QR code. For example, the network QR code includes a MAC address and networking information, and supports connection without confirmation.

1502: The large screen delivers a quantity of projection devices, and the mobile phone 1 negotiates parameters such as resolution with the large screen, and waits for confirmation of the large screen.

The mobile phone 1 scans the QR code for P2P connection. The large screen broadcasts and delivers that the quantity of current projection devices is changed to 1. The mobile phone adjusts and reports projection resolution and coding parameters based on the quantity of current projection devices. The large screen receives the resolution and coding parameters. In this case, the negotiation is completed, and the large screen sends a playing notification.

1503: The mobile phone 1 receives an acknowledgment, and starts to transmit audio and video data.

1504: The large screen plays a video of the mobile phone 1, and selects, according to a policy, a speaker to play audio (for example, plays the audio through all speakers).

After receiving the playing notification, the mobile phone starts to transmit a projection data stream. The large screen plays the audio of mobile phone 1 through left and right speakers.

1505: The large screen moves the QR code to the right, and a mobile phone 2 scans the QR code for connection. It may be understood that, in another implementation, the large screen may alternatively move the QR code to the left, and wait for access of the mobile phone 2.

1506*a*: The large screen updates and delivers the quantity of projection devices (in this case, the quantity of projection devices is 2), and the mobile phone 1 negotiates parameters such as resolution with the large screen, and waits for confirmation of the large screen.

1507*a*: The mobile phone 1 receives an acknowledgment, and continues to transmit the audio and video data.

1508*a*: The large screen plays the video of the mobile phone 1 in split-screen mode, and selects, according to the policy, a speaker to play the audio (for example, plays the audio through the left speaker).

1506*b*: The large screen sends an updated quantity of projection devices to the mobile phone 2, and the mobile phone 2 negotiates parameters such as resolution with the large screen, and waits for confirmation of the large screen.

1507*b*: The mobile phone 2 receives an acknowledgment, and starts to transmit audio and video data.

1508*b*: The large screen plays a video of the mobile phone 2 in split-screen mode, and selects, according to the policy, a speaker to play audio (for example, plays the audio through the right speaker).

The large screen moves the QR code to the right or left. The mobile phone 2 scans the QR code for P2P connection. The large screen broadcasts and delivers that the quantity of current projection devices is changed to 2. The mobile phone 1 and the mobile phone 2 adjust and report the projection resolution and coding parameters based on the quantity of current projection devices. The large screen receives the resolution and encoding parameters. In this case, the negotiation is complete, and the large screen sends a playing notification. After receiving the playing notification, the mobile phone 1 and the mobile phone 2 start to transmit the projection data streams. The large screen plays the audio of mobile phone 1 through the left speaker, and plays the audio of mobile phone 2 through the right speaker.

In addition, after the mobile phone 2 successfully performs projection, the large screen may hide the QR code.

In the foregoing embodiment of this application, when the two mobile phones are in the P2P connection in a wireless manner, and are simultaneously projected onto the large screen, different audio output directions are selected to meet the newly added devices, so as to improve audio-visual experience of a corresponding user. When only the mobile phone 1 performs projection, the audio data of mobile phone 1 is played by using the speakers on the two sides. After the mobile phone 2 joins projection, a video of mobile phone 1 is displayed on a left part of the screen, and the audio is played through the left speaker. A video of mobile phone 2 is displayed on a right part of the screen, and the corresponding audio is played through the right speaker. Alternatively, after the mobile phone 2 joins projection, a video of mobile phone 1 is displayed on a right part of the screen, and the audio is played through the right speaker. A video of mobile phone 2 is displayed on a left part of the screen, and the corresponding audio is played through the left speaker. In this way, the projectionist can focus on sensory experience of projected content on the user's side, and can use the large screen to improve sharing experience.

It can be learned from the example of the foregoing embodiment that when a plurality of channels of projection are input, and a quantity of speaker devices (including externally connected speaker devices) mounted on the large screen is sufficient, each channel of audio is decoded and sent to different speaker devices for playing, and an audio output direction may be adaptively selected after the video is added, to upgrade audio-visual experience of the user, and provide a support to an app or a game that requires an interaction and shared perspective but focuses on a sound effect on the user's side. In this way, the projectionist associates audio with the video on senses, to improve audio-visual experience.

Embodiments of this disclosure disclose an electronic device. The electronic device may be the source device, or may be the destination device. The electronic device may include a processor, and a memory, an input device, and an output device that are connected to the processor. The input device and the output device may be integrated into one device. For example, a touch sensor may be used as an input device, a display may be used as an output device, and the touch sensor and the display may be integrated into a touchscreen.

Figure 16:
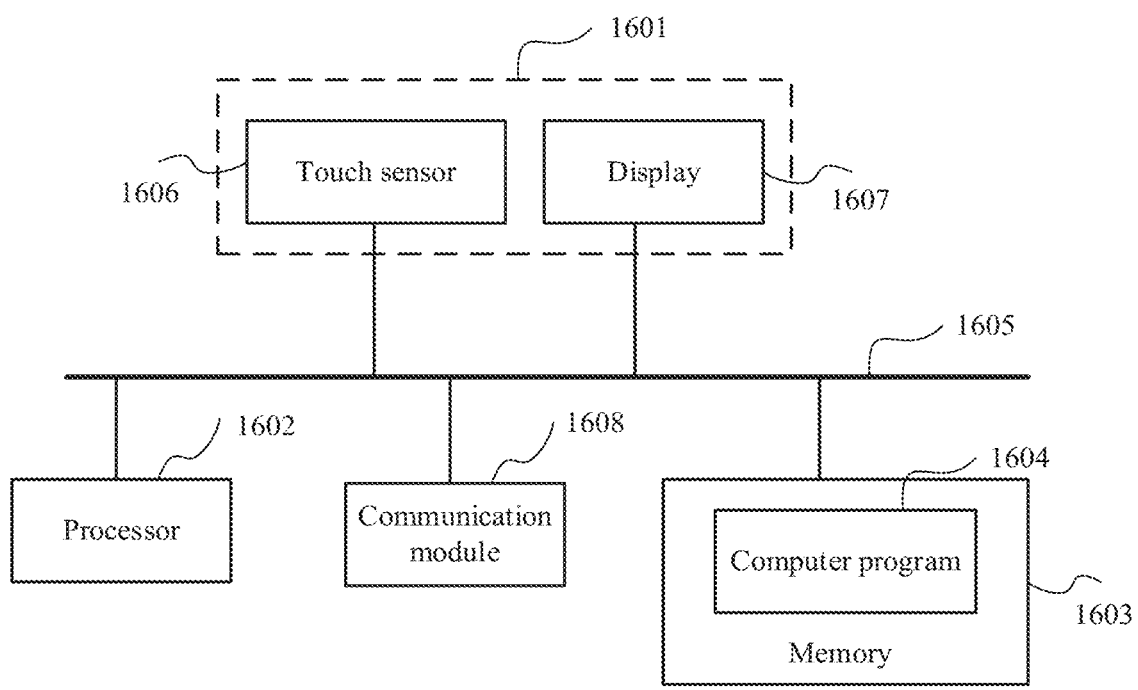
FIG. 16 is a schematic diagram 2 of a structure of an electronic device according to an embodiment of this application.

In this case, as shown in FIG. 16, the electronic device may include a touchscreen 1601, one or more processors 1602, a memory 1603, a communication module 1608, one or more applications (not shown), and one or more computer programs 1604. The touchscreen 1601 includes a touch sensor 1606 and a display 1607. The foregoing components may be connected through one or more communication buses 1605. The one or more computer programs 1604 are stored in the memory 1603 and are configured to be executed by the one or more processors 1602. The one or more computer programs 1604 include instructions, and the instructions may be used to perform the steps in corresponding embodiments. All related content of the steps in the foregoing method embodiments may be cited in function descriptions of corresponding physical components. Details are not described herein again. It may be understood that the electronic device may also include a display. The touch sensor and the display do not integrate into a touchscreen. Input may be performed in another input manner, for example, a keyboard, a mouse, a remote control, or a touch sensor that is not integrated with the display.

For example, the processor 1602 may be the processor 110 shown in FIG. 3, the memory 1603 may be the internal memory 116 and/or the external memory 160 shown in FIG. 3, the display 1607 may be the display 194 shown in FIG. 3, and the touch sensor 1606 may be the touch sensor in the sensor module 180 shown in FIG. 3. This is not limited in embodiments of this application.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

Functional units in embodiments of this disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes: any medium that can store program code, such as a flash memory, a removable hard disk, a read-only memory, a RAM, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this disclosure shall fall within the protection scope of embodiments of this application. Therefore, the protection scope of embodiments of this disclosure shall be subject to the protection scope of the claims.

What is claimed is:

1. A method implemented by a destination device, comprising:
   providing first identification information on a screen of the destination device for a first source device to scan to communicate with the destination device, wherein the first identification information is located on a first side of the screen;
   providing second identification information on the screen for a second source device to scan to communicate with the destination device, wherein the second identification information is located on a second side of the screen;
   communicating with the first source device after receiving a first request from the first source device;
   communicating with the second source device after receiving a second request from the second source device;
   receiving first data from the first source device and second data from the second source device, wherein the first data comprises first display data and first audio data, and wherein the second data comprises second display data and second audio data;
   displaying the first display data in a first screen subarea of the screen and the second display data in a second screen subarea of the screen, wherein the first screen subarea is located on the first side, and wherein the second screen subarea is located on the second side;
   wirelessly connecting to a first speaker device corresponding to the first source device, wherein the first speaker device is an external speaker;

causing the first audio data to play on the first speaker device; and playing the second audio data using a second speaker device corresponding to the second source device, wherein the second speaker device is a built-in audio module of the destination device.

2. The method of claim 1, further comprising configuring, based on a preset relationship, the first speaker device corresponding to the first source device and the second speaker device corresponding to the second source device.

3. The method of claim 1, wherein the second speaker device comprises a speaker.

4. The method of claim 3, wherein the first data comprises first projection data, and wherein the second data comprises second projection data.

5. The method of claim 1, wherein at least one of the first identification information or the second identification information is a quick response (QR) code.

6. The method of claim 1, wherein either the first side is a left side and the second side is a right side, or the first side is the right side and the second side is the left side.

7. A destination device, comprising:

a screen comprising a first screen subarea and a second screen subarea, wherein the first screen subarea is located on a first side of the screen, and wherein the second screen subarea is located on a second side of the screen;

a speaker device comprising a built-in audio module of the destination device;

a memory configured to store instructions; and one or more processors coupled to the screen, the speaker device, and the memory and configured to execute the instructions to cause the destination device to:

provide first identification information on the screen for a first source device to scan to communicate with the destination device, wherein the first identification information is located on the first side;

provide second identification information on the screen for a second source device to scan to communicate with the destination device, wherein the second identification information is located on the second side;

communicate with the first source device after receiving a first request from the first source device;

communicate with the second source device after receiving a second request from the second source device;

receive first data from the first source device and second data from the second source device, wherein the first data comprises first display data and first audio data, and wherein the second data comprises second display data and second audio data;

display the first display data in the first screen subarea and the second display data in the second screen subarea; and play the first audio data by using an external speaker and the second audio data by using the speaker device, wherein the external speaker corresponds to the first source device, and wherein the speaker device corresponds to the second source device.

8. The destination device of claim 7, wherein the instructions further cause the destination device to configure, based on a preset relationship, the external speaker corresponding to the first source device and the speaker device corresponding to the second source device.

9. The destination device of claim 7, wherein the speaker device comprises at least one speaker.

10. The destination device of claim 7, wherein the first data comprises first projection data, and wherein the second data comprises second projection data.

11. The destination device of claim 7, wherein at least one of the first identification information or the second identification information is a quick response (QR) code.

12. The destination device of claim 7, wherein either the first side is a left side, and the second side is a right side, or the first side is the right side, and the second side is the left side.

13. A computer program product comprising instructions stored on a non-transitory computer readable medium that, when executed by one or more processors, cause a destination device to:

provide first identification information on a screen of the destination device for a first source device to scan to communicate with the destination device, wherein the first identification information is located on a first side of the screen;

provide second identification information on the screen for a second source device to scan to communicate with the destination device, wherein the second identification information is located on a second side of the screen;

communicate with the first source device after receiving a first request from the first source device;

communicate with the second source device after receiving a second request from the second source device;

receive first data from the first source device and second data from the second source device, wherein the first data comprises first display data and first audio data, and wherein the second data comprises second display data and second audio data;

display the first display data in a first screen subarea of the screen and the second display data in a second screen subarea of the screen, wherein the first screen subarea is located on the first side, and wherein the second screen subarea is located on the second side;

wirelessly connect to a first speaker device corresponding to the first source device, wherein the first speaker device is an external speaker;

cause the first audio data to play on the first speaker device; and play the second audio data using a second speaker device corresponding to the second source device, wherein the second speaker device is a built-in audio module of the destination device.

14. The computer program product of claim 13, wherein the instructions further cause the destination device to obtain, based on a preset relationship, the first speaker device corresponding to the first source device and the second speaker device corresponding to the second source device.

15. The computer program product of claim 13, wherein the second speaker device comprises a speaker.

16. The computer program product of claim 15, wherein the first data comprises first projection data, and wherein the second data comprises second projection data.

17. The computer program product of claim 13, wherein the first identification information comprises a quick response (QR) code.

18. The computer program product of claim 13, wherein the second identification information is a quick response (QR) code.

19. The computer program product of claim 13, wherein the first identification information and the second identification information comprise a quick response (QR) code.

20. The computer program product of claim 13, wherein either the first side is a left side, and the second side is a right side, or the first side is the right side, and the second side is the left side.

* * * * *